(12) United States Patent
Mahmoudi

(10) Patent No.: US 12,325,535 B2
(45) Date of Patent: Jun. 10, 2025

(54) ASCENT AND DESCENT OF A BALLOON

(71) Applicant: Mohammad Mahdi Mahmoudi, Mashhad (IR)

(72) Inventor: Mohammad Mahdi Mahmoudi, Mashhad (IR)

(*) Notice: Subject to any disclaimer, the term of this patent is extended or adjusted under 35 U.S.C. 154(b) by 301 days.

(21) Appl. No.: 17/374,205

(22) Filed: Jul. 13, 2021

(65) Prior Publication Data

US 2021/0339841 A1 Nov. 4, 2021

Related U.S. Application Data

(60) Provisional application No. 63/051,395, filed on Jul. 14, 2020.

(51) Int. Cl.
*B64F 3/00* (2006.01)
*B64B 1/52* (2006.01)
*B66D 1/60* (2006.01)

(52) U.S. Cl.
CPC ............ *B64F 3/00* (2013.01); *B64B 1/52* (2013.01); *B66D 1/60* (2013.01)

(58) Field of Classification Search
CPC ..... B64B 1/50; B64B 1/52; B64B 1/56; B64F 3/00
See application file for complete search history.

(56) References Cited

U.S. PATENT DOCUMENTS

| | | | | |
|---|---|---|---|---|
| 152,145 A * | 6/1874 | Mcglashan | ............... | B64B 1/40 104/246 |
| 247,571 A * | 9/1881 | Mcglashan | ............... | B61B 5/02 104/22 |
| 287,458 A * | 10/1883 | Olmsted | ................... | B61B 5/02 104/246 |
| 372,381 A * | 11/1887 | Muller | ...................... | B64B 1/50 104/146 |
| 392,632 A * | 11/1888 | Oney | ........................ | B61B 5/02 104/22 |
| 3,346,127 A * | 10/1967 | Pelton | ..................... | B64D 1/00 212/71 |
| 3,359,919 A * | 12/1967 | Stewart | ..................... | B64B 1/40 104/22 |
| 3,448,864 A * | 6/1969 | Fenn | ........................ | B64B 1/40 244/33 |
| 3,706,385 A * | 12/1972 | Stewart | .................. | B66C 21/00 104/122 |
| 3,865,251 A * | 2/1975 | Langford | ................ | B66C 21/00 244/33 |
| 4,055,316 A * | 10/1977 | Chipper | .................... | B64B 1/50 104/23.1 |

(Continued)

FOREIGN PATENT DOCUMENTS

DE 29605051 U1 * 6/1996 ............. A63G 31/16
KR 200338535 Y1 * 10/2003

(Continued)

*Primary Examiner* — Magdalena Topolski

(57) ABSTRACT

A system for ascending and descending a balloon. The system includes a first car, a first winch, a first cable, a second car, a second winch, a second cable, a memory, and one or more processors. The one or more processors are configured to perform a method, the method comprising ascending and descending the balloon by control movements of the first car, the first winch, the first cable, the second car, and the second winch.

16 Claims, 19 Drawing Sheets

(56) References Cited

U.S. PATENT DOCUMENTS

| | | | |
|---|---|---|---|
| 6,792,872 B1* | 9/2004 | Valdespino | B64B 1/50 104/22 |
| 11,591,113 B2* | 2/2023 | Bougon | B64B 1/66 |
| 2009/0184196 A1* | 7/2009 | Price | B64D 1/22 244/33 |
| 2011/0057158 A1* | 3/2011 | Von Kessel | B64B 1/50 254/323 |

FOREIGN PATENT DOCUMENTS

| | | | | |
|---|---|---|---|---|
| WO | WO-0066424 A1 * | 11/2000 | | B64B 1/42 |
| WO | WO-2008019812 A1 * | 2/2008 | | B64B 1/50 |
| WO | WO-2019162737 A1 * | 8/2019 | | |

* cited by examiner

100

ASCENT AND DESCENT OF A BALLOON

CROSS-REFERENCE TO RELATED APPLICATION

This application claims the benefit of priority from U.S. Provisional Patent Application Ser. No. 63/051,395, filed on Jul. 14, 2020, and entitled "MOTION AND SEMI-MOTION LINEAR MECHANISM FOR ASCEND & DESCEND OF THE BALLOON WITH CONSTANT JOINT ANGLE" which is incorporated herein by reference in its entirety.

TECHNICAL FIELD

This disclosure relates to aviation systems, and particularly relates to balloons and airships. More particularly, the present disclosure relates to a system for ascending and descending a balloon.

BACKGROUND

A balloon is generally tethered to the ground by utilizing one or more retrieval towing cables. A tethered balloon may need to ascend and descend at various times. When a tethered balloon ascends and/or descends in air, an angle β (which may be defined as an angle between a retrieval towing cable of the balloon and the horizon line) may constantly change during ascent and/or descent of the balloon. In other words, angle β may be different at different heights of the balloon. Changes in angle β during ascent and descent of a balloon may significantly affect the balloon's dynamic performance and may impose unwanted movements and momentums to the balloon. Therefore, there is a need for a system for balloon ascent and descent that is able to keep the angle β of a balloon constant during ascent and descent of the balloon.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary system for ascending and descending a balloon. An exemplary system may include a first car, a first winch, a first cable, a second car, a second winch, a second cable, and one or more processors.

In an exemplary embodiment, the first car may be configured to move back and forth along a first axis. In an exemplary embodiment, the first winch may be associated with the first car. In an exemplary embodiment, the first cable may be interconnected between the first car and the balloon. In an exemplary embodiment, a first end of the first cable may be attached to the balloon. In an exemplary embodiment, a second end of the first cable may be wrapped around the first winch.

In an exemplary embodiment, the first winch may be configured to increase a first length of the first cable between the first car and the balloon responsive to rotating the first winch in a first rotational direction around a main axis of the first winch. In an exemplary embodiment, the first winch may further be configured to decrease the length of the first cable between the first car and the balloon responsive to rotating the first winch in a second rotational direction around the main axis of the first winch. In an exemplary embodiment, the second rotational direction may be opposite the first rotational direction.

In an exemplary embodiment, the second car may be configured to move back and forth along the first axis. In an exemplary embodiment, the second winch may be associated with the second car. In an exemplary embodiment, the second cable interconnected between the second car and the balloon, a first end of the second cable may be attached to the balloon. In an exemplary embodiment, a second end of the second cable may be wrapped around the second winch.

In an exemplary embodiment, the second winch may be configured to increase a second length of the second cable between the second car and the balloon responsive to rotating the second winch in a third rotational direction around a main axis of the second winch. In an exemplary embodiment, the second winch may further be configured to decrease the second length of the second cable between the second car and the balloon responsive to rotating the second winch in a fourth rotational direction around the main axis of the second winch, the fourth rotational direction opposite the third rotational direction.

In an exemplary embodiment, the memory may have process-readable instructions stored therein. In an exemplary embodiment, the one or more processors may be configured to access the memory and execute the processor-readable instructions, which, when executed by one or more processors configures the one or more processors to perform a method.

In an exemplary embodiment, the method may include ascending the balloon by moving the first car along the first axis and in a first direction, rotating the first winch in the first rotational direction around the main axis of the first winch, moving the second car along the first axis and in a second direction, and rotating the second winch in the third rotational direction around the main axis of the second winch. In an exemplary embodiment, the second direction may be opposite the first direction.

In an exemplary embodiment, the method may further include descending a balloon by moving the first car along the first axis and in the second direction, rotating the first winch in the second rotational direction around the main axis of the first winch, moving the second car along the first axis and in the first direction, and rotating the second winch in the fourth rotational direction around the main axis of the second winch.

In an exemplary embodiment, the system may further include a first rail and a second rail. In an exemplary embodiment, a main axis of the first rail may be aligned with the first axis. In an exemplary embodiment, the first car may include a first plurality of wheels attached to a bottom surface of the first car. In an exemplary embodiment, the first plurality of wheels may be configured to be engaged with the first rail. In an exemplary embodiment, the first car may be configured to move on the first rail.

In an exemplary embodiment, a main axis of the second rail may be aligned with the first axis. In an exemplary embodiment, the second car may include a second plurality of wheels attached to a bottom surface of the second car. In an exemplary embodiment, the second plurality of wheels may be configured to be engaged with the second rail. In an exemplary embodiment, the second car may be configured to move on the second rail. In an exemplary embodiment, the first rail may be configured to limit movements of the first car to a linear movement along the first axis. In an exemplary embodiment, the second rail may be configured to limit movements of the second car to a linear movement along the first axis.

In an exemplary embodiment, the system may further include a first winch motor and a second winch motor. In an exemplary embodiment, the first winch motor may be connected to the first winch. In an exemplary embodiment, the first winch motor may be configured to urge the first winch to rotate around the main axis of the first winch. In an exemplary embodiment, the second winch motor may be connected to the second winch. In an exemplary embodiment, the second winch motor may be configured to urge the second winch to rotate around the main axis of the second winch.

In an exemplary embodiment, the first car may include a first wagon and a first motor. In an exemplary embodiment, the first motor may be disposed inside the first wagon. In an exemplary embodiment, the first motor may be configured to urge the first car to move along the first axis. In an exemplary embodiment, the second car may include a second wagon and a second motor. In an exemplary embodiment, the second motor may be disposed inside the second wagon. In an exemplary embodiment, the second motor may be configured to urge the second car to move along the first axis.

In an exemplary embodiment, the second end of the first cable may be attached to a first side of the balloon. In an exemplary embodiment, the second end of the second cable may be attached to a second side of the balloon. In an exemplary embodiment, the first side of the balloon may be opposite the second side of the balloon. In an exemplary embodiment, the first winch may be attached to an external side of the first wagon. In an exemplary embodiment, the first winch may be fixedly attached to the first rail at a distal end of the first rail. In an exemplary embodiment, the second winch attached to an external side of the second wagon. In an exemplary embodiment, the second winch may be attached to an external side of the second wagon. In an exemplary embodiment, the second winch may be fixedly attached to the second rail at a distal end of the second rail.

In an exemplary embodiment, the system may further include a third car, a third winch, and a third cable. In an exemplary embodiment, the third car may be configured to move back and forth along a second axis. In an exemplary embodiment, the third winch may be associated with the third car. In an exemplary embodiment, the third cable may be interconnected between the third car and the balloon.

In an exemplary embodiment, a first end of the third cable may be attached to the balloon. In an exemplary embodiment, a second end of the third cable may be wrapped around the third winch. In an exemplary embodiment, the third winch may be configured to increase a third length of the third cable between the third car and the balloon responsive to rotating the third winch in a fifth rotational direction around a main axis of the third winch.

In an exemplary embodiment, the third winch may further be configured to decrease the third length of the third cable between the third car and the balloon responsive to rotating the third winch in a sixth rotational direction around the main axis of the third winch, the sixth rotational direction opposite the fifth rotational direction.

In an exemplary embodiment, the system may further include a fourth car, a fourth winch, and a fourth cable. In an exemplary embodiment, the fourth car may be configured to move back and forth along the second axis. In an exemplary embodiment, the fourth winch may be associated with the fourth car. In an exemplary embodiment, the fourth cable may be interconnected between the fourth car and the balloon, a first end of the fourth cable attached to the balloon, a second end of the fourth cable wrapped around the fourth winch.

In an exemplary embodiment, the fourth winch may be configured to increase a fourth length of the fourth cable between the fourth car and the balloon responsive to rotating the fourth winch in a seventh rotational direction around a main axis of the fourth winch. In an exemplary embodiment, the fourth winch may further be configured to decrease the fourth length of the fourth cable between the fourth car and the balloon responsive to rotating the fourth winch in an eighth rotational direction around the main axis of the fourth winch, the eighth rotational direction opposite the seventh rotational direction.

In an exemplary embodiment, ascending the balloon may further include moving the third car along the second axis and in a third direction, rotating the third winch in the fifth rotational direction around the main axis of the third winch, moving the fourth car along the second axis and in a fourth direction, the fourth direction opposite the third direction, and rotating the fourth winch in the seventh rotational direction around the main axis of the fourth winch.

In an exemplary embodiment, descending the balloon may further include moving the third car along the second axis and in the fourth direction, rotating the third winch in the sixth rotational direction around the main axis of the third winch, rotating the third winch in the sixth rotational direction around the main axis of the third winch, and rotating the fourth winch in the eighth rotational direction around the main axis of the fourth winch. In an exemplary embodiment, the second axis may be perpendicular to the first axis.

In an exemplary embodiment, the system may further include a third rail and a fourth rail. In an exemplary embodiment, a main axis of the third rail may be aligned with the second axis. In an exemplary embodiment, the third car may include a third plurality of wheels attached to a bottom surface of the third car. In an exemplary embodiment, the third plurality of wheels may be configured to be engaged with the third rail. In an exemplary embodiment, the third car may be configured to move on the third rail.

In an exemplary embodiment, a main axis of the fourth rail may be aligned with the second axis. In an exemplary embodiment, the fourth car may include a fourth plurality of wheels attached to a bottom surface of the fourth car. In an exemplary embodiment, the fourth plurality of wheels may be configured to be engaged with the second rail, the fourth car configured to move on the fourth rail.

In an exemplary embodiment, the third rail may be configured to limit movements of the third car to a linear movement along the second axis. In an exemplary embodiment, the fourth rail may be configured to limit movements of the fourth car to a linear movement along the second axis.

In an exemplary embodiment, the system may further include a third winch motor and a fourth winch motor. In an exemplary embodiment, the third winch motor may be connected to the third winch. In an exemplary embodiment, the third winch motor may be configured to urge the third winch to rotate around the main axis of the third winch. In an exemplary embodiment, the fourth winch motor may be connected to the fourth winch. In an exemplary embodiment, the fourth winch motor may be configured to urge the fourth winch to rotate around the main axis of the fourth winch.

In an exemplary embodiment, the third car may include a third wagon and a third motor. In an exemplary embodiment, the third motor may be disposed inside the third wagon. In an exemplary embodiment, the third motor may be configured to urge the third car to move along the second axis.

In an exemplary embodiment, the second end of the third cable may be attached to a third side of the balloon. In an exemplary embodiment, the second end of the fourth cable attached to a fourth side of the balloon. In an exemplary embodiment, the fourth side of the balloon opposite the third side of the balloon. In an exemplary embodiment, the third winch may be attached to an external side of the third wagon. In an exemplary embodiment, the fourth winch may be attached to an external side of the fourth wagon. In an exemplary embodiment, the third winch may be fixedly attached to the third rail at a distal end of the third rail. In an exemplary embodiment, the fourth winch may be fixedly attached to the fourth rail at a distal end of the fourth rail.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
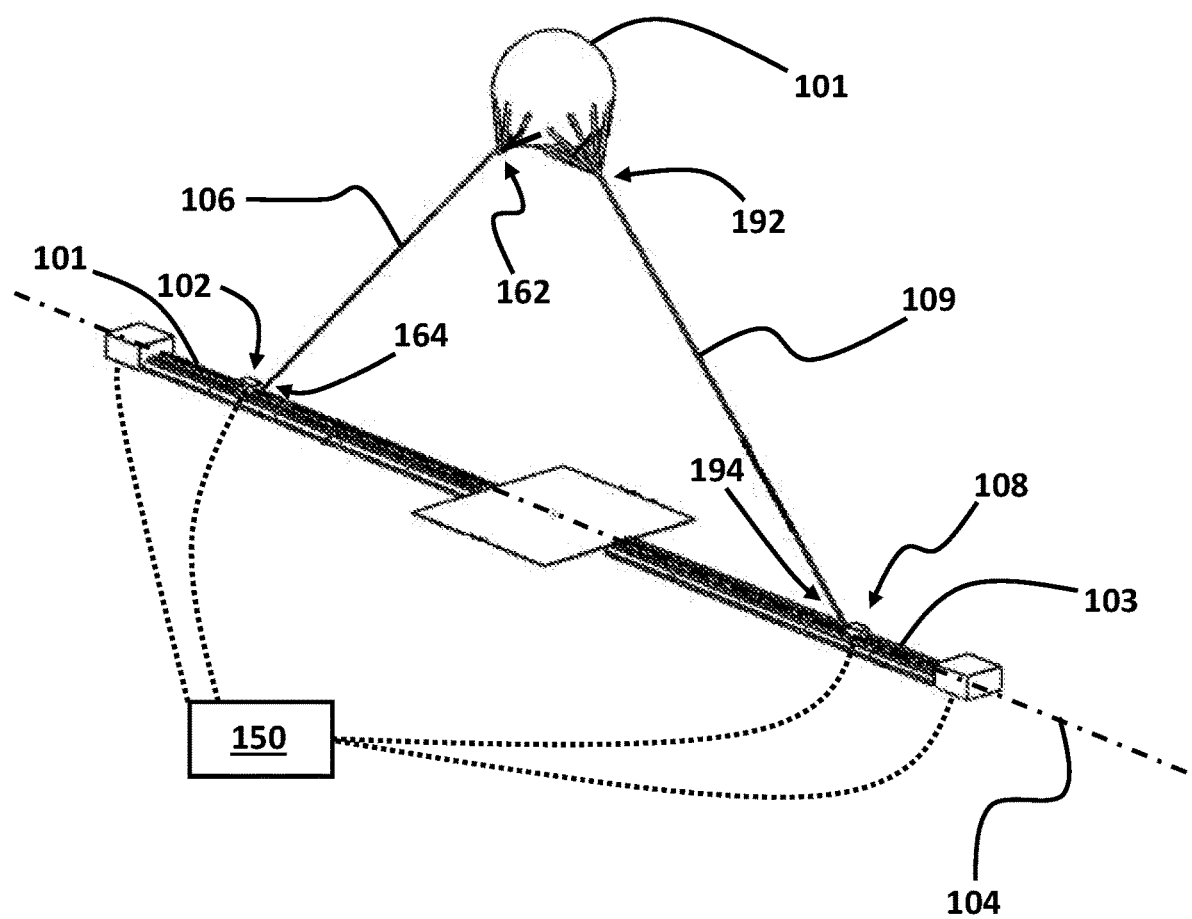
FIG. 1A illustrates a perspective view of a system for ascent and descent of a balloon, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Disclosed herein is a system for ascending and descending a balloon. An exemplary system may include a first car and a second car which both may be configured to move back and forth along a first axis. That is, for example, each of cars may have a respective motor and respective wheels in which a motor moves the related wheels. An exemplary system may further include a first cable which may be interconnected between the first car and the balloon. A first end of the first cable may be attached to a first side of the balloon. The second end of the first cable may be wrapped around a first winch attached to the first car. The first winch may decrease and/or increase a length of the first cable between the first car and the balloon by wrapping or unwrapping the first cable around the first winch. An exemplary system may further include a second cable interconnected between the second car and the balloon. A first end of the second cable may be attached to a second side of the balloon. The second end of the second cable may be connected to a second winch attached to the second car. The second winch may decrease and/or increase a length of the second cable between the second car and the balloon by wrapping or unwrapping the second cable around the second winch.

An exemplary system may further include a processor which may control movements of the first car, the first winch, the second car, and the second winch. An exemplary processor may control movements of the first car, the first winch, the second car, and the second winch in such a way that when the balloon ascend or descend in air, a first angle between a main axis of the first cable and the horizon line and also a second angle between a main axis of the second cable and the horizon line remain constant. An exemplary processor may control linear speed of the first car and rotational speed of the first winch in such a way that the first angle remains constant. An exemplary processor may control linear speed of the second car and rotational speed of the second winch in such a way that the second angle remains constant.

Figure 1B:
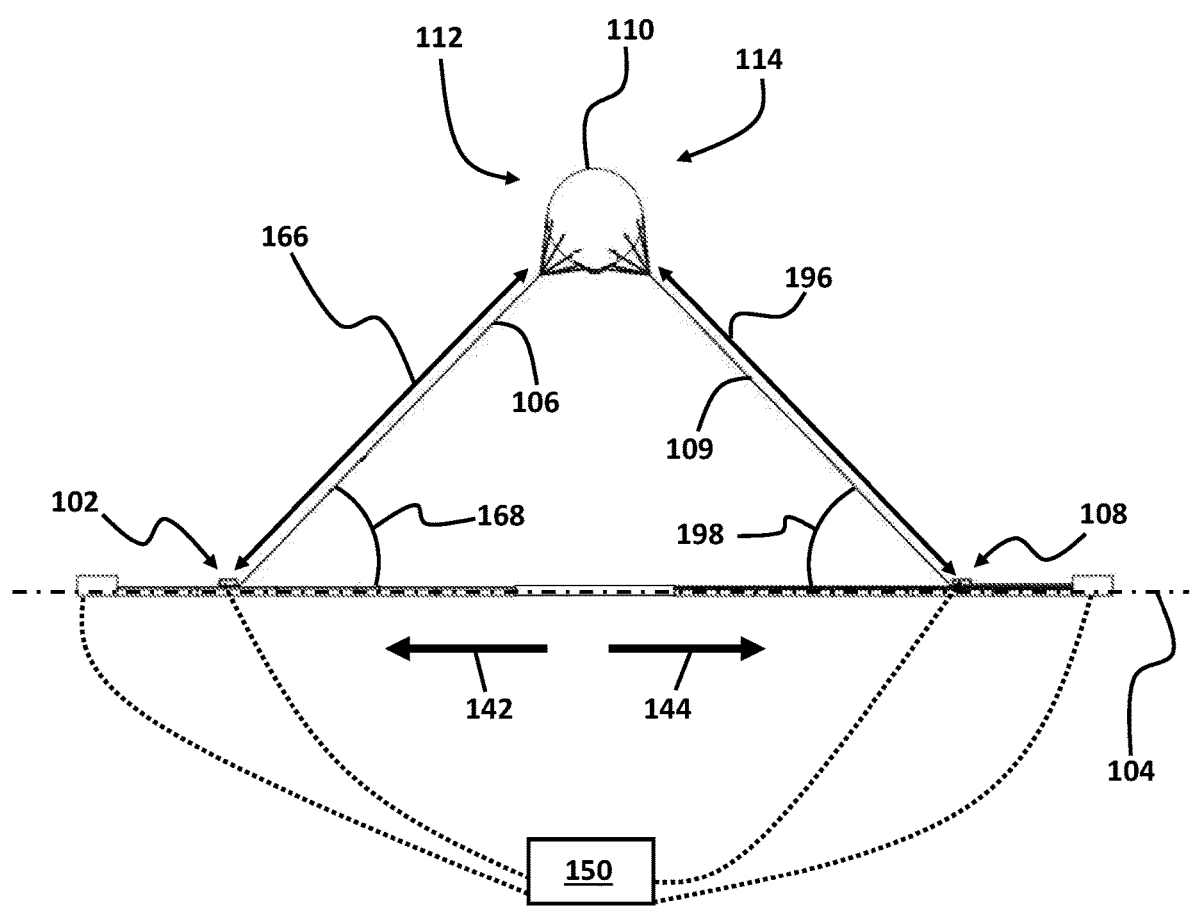
FIG. 1B illustrates a side view of a system for ascent and descent of a balloon, consistent with one or more exemplary embodiments of the present disclosure.
Figure 2A:
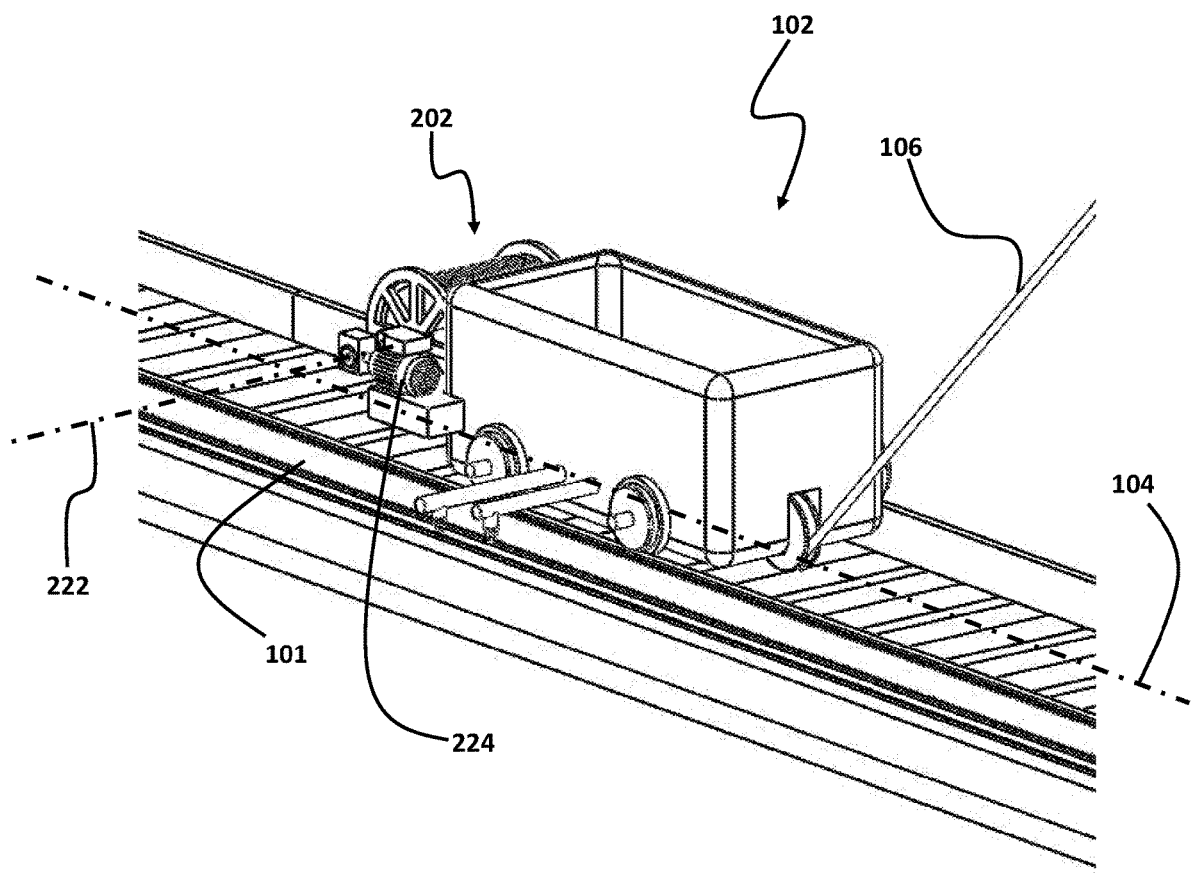
FIG. 2A illustrates a perspective view of a first car, consistent with one or more exemplary embodiments of the present disclosure.
Figure 2B:
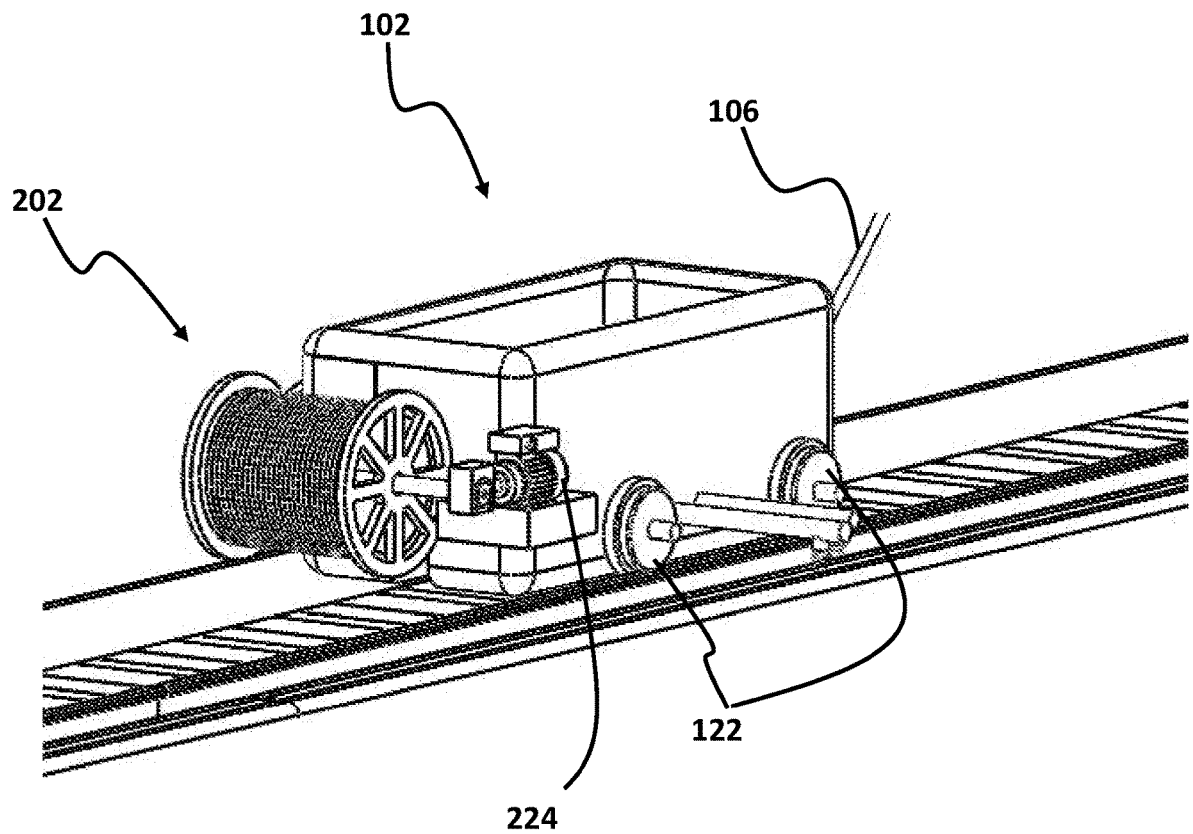
FIG. 2B illustrates another perspective view of the first car, consistent with one or more exemplary embodiments of the present disclosure.
Figure 2C:
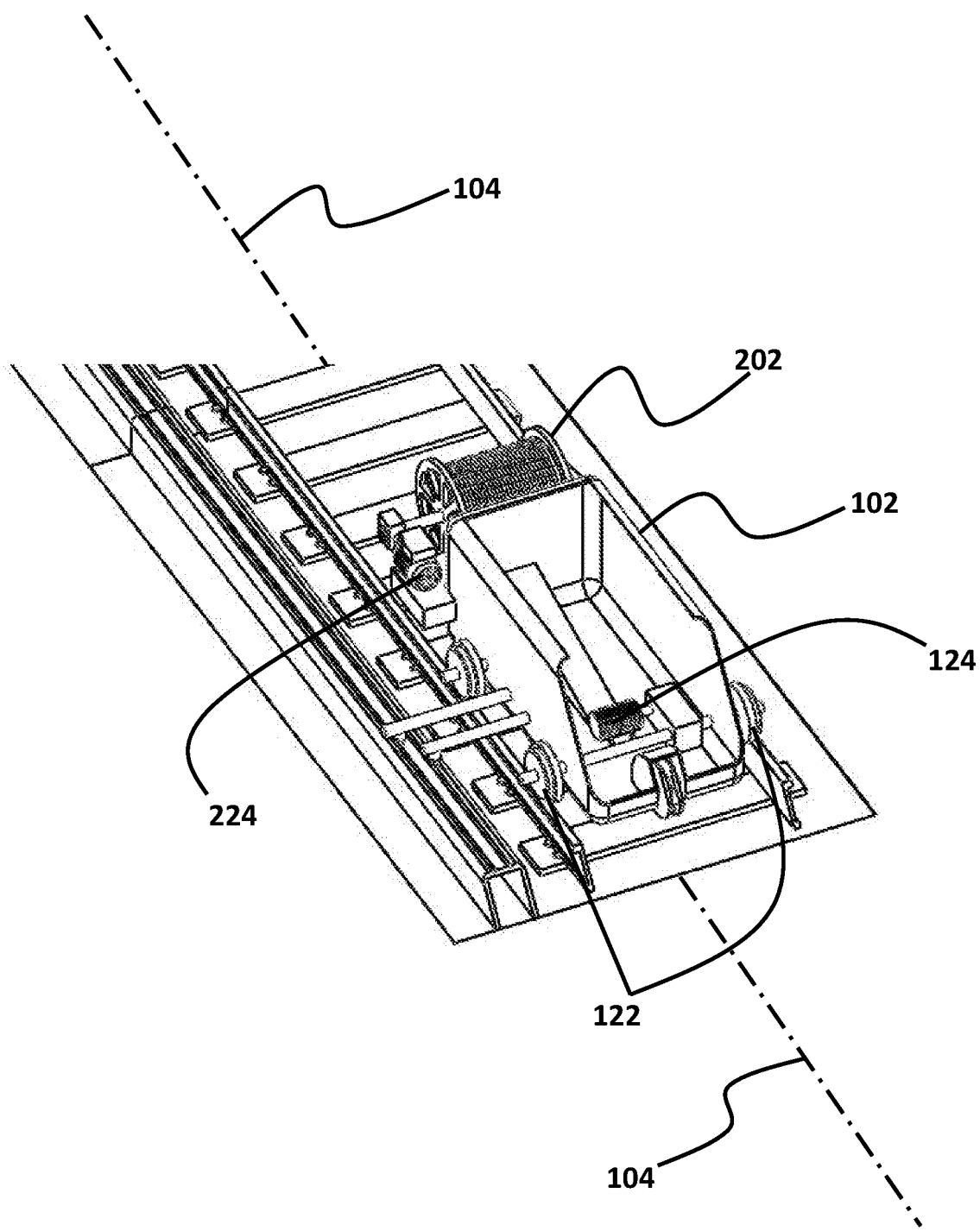
FIG. 2C illustrates another perspective view of the first car, consistent with one or more exemplary embodiments of the present disclosure.
Figure 2D:
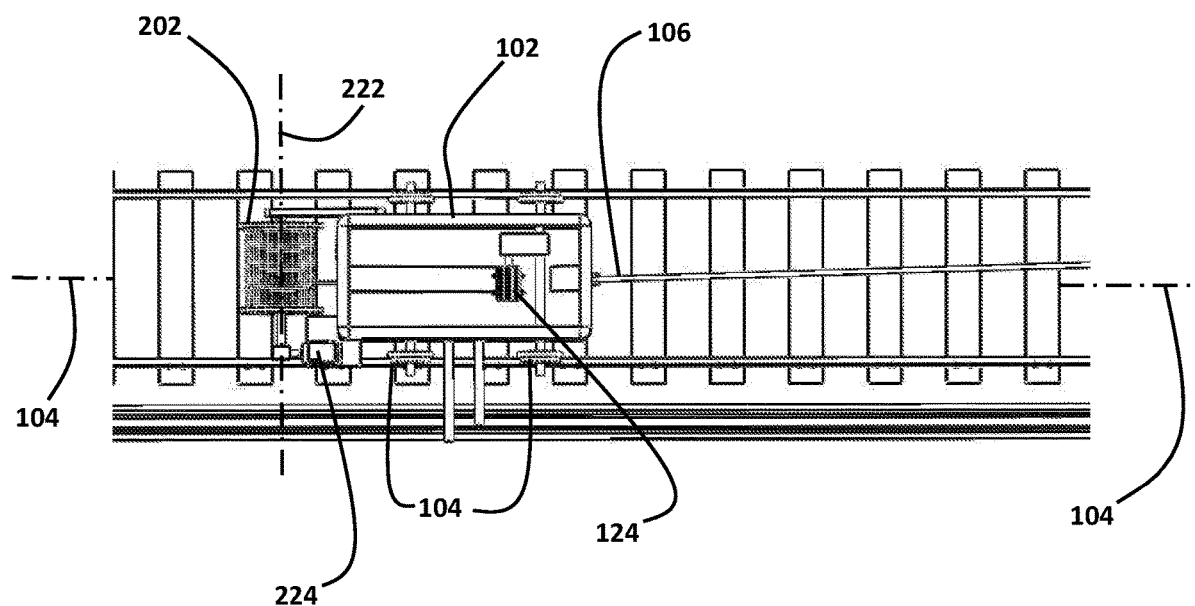
FIG. 2D illustrates a top view of a first car, consistent with one or more exemplary embodiments of the present disclosure.
Figure 2E:
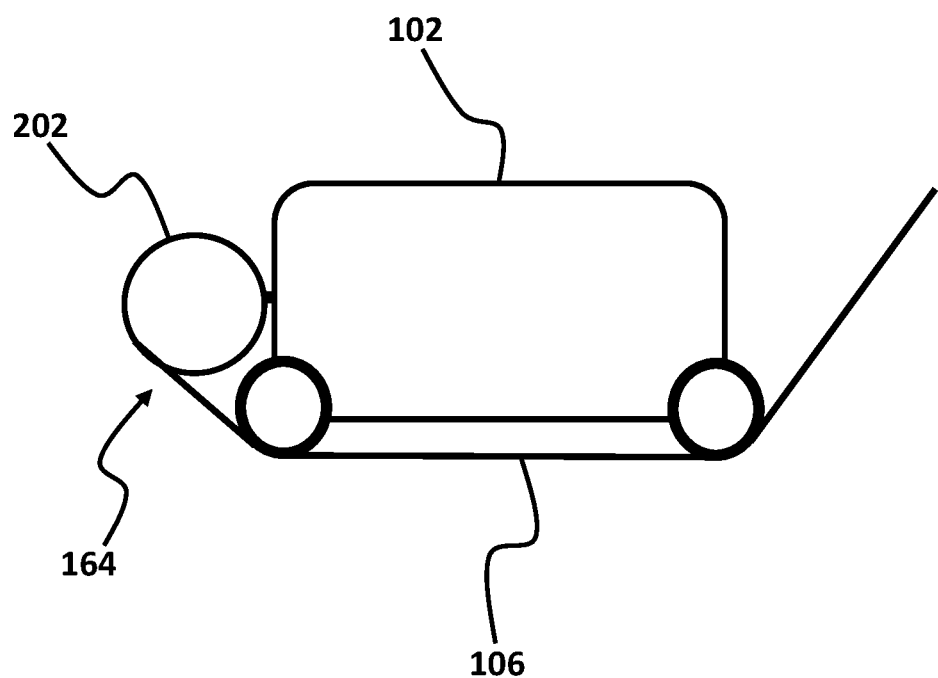
FIG. 2E illustrates a side view of a first car, consistent with one or more exemplary embodiments of the present disclosure.
Figure 2F:
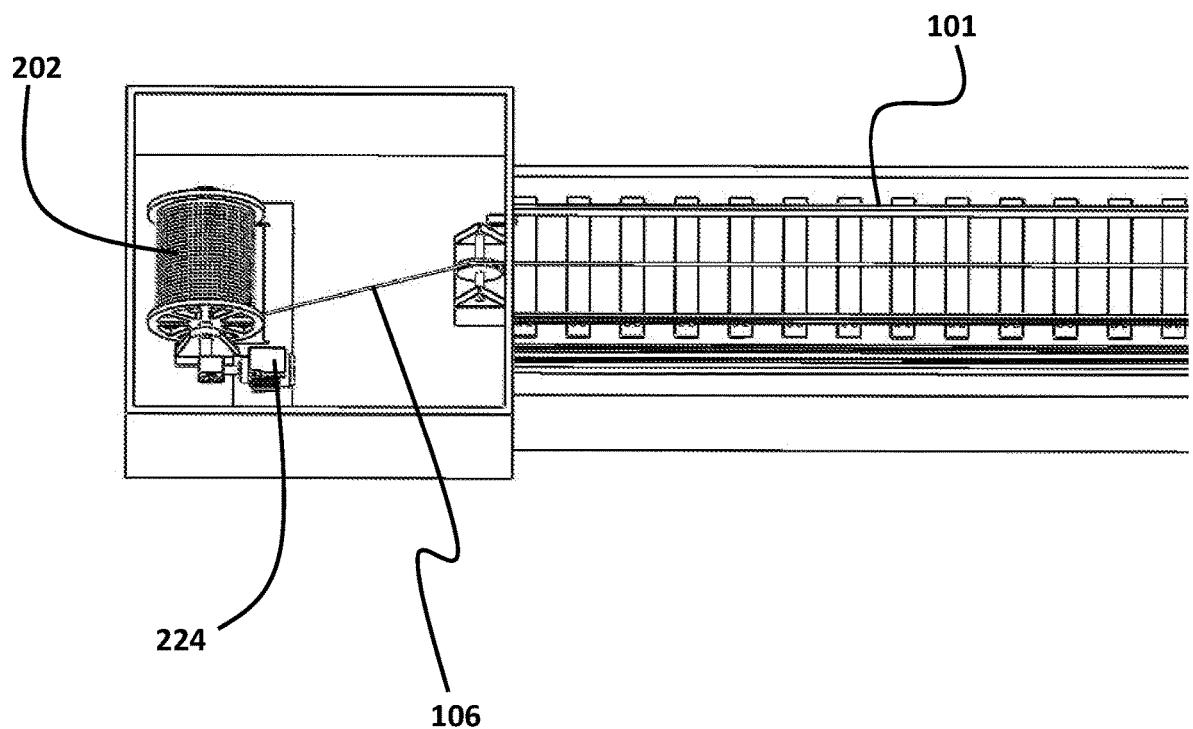
FIG. 2F illustrates a system, consistent with one or more exemplary embodiments of the present disclosure.
Figure 2G:
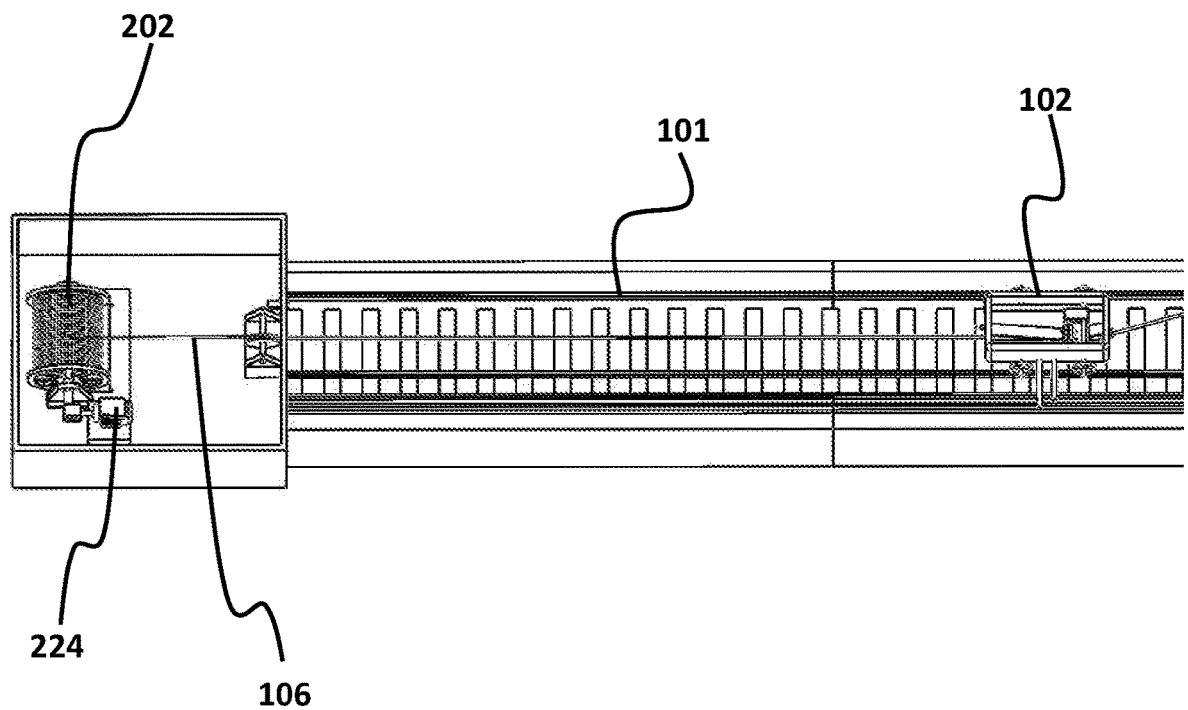
FIG. 2G illustrates a system, consistent with one or more exemplary embodiments of the present disclosure.

Herein is disclosed an exemplary system for ascent and descent of a balloon. FIG. 1A shows a perspective view of a system 100, consistent with one or more exemplary embodiments of the present disclosure. FIG. 1B shows a side view of system 100, consistent with one or more exemplary embodiments of the present disclosure. An exemplary system 100 may include a first car 102. FIG. 2A shows a perspective view of first car 102, consistent with one or more exemplary embodiments of the present disclosure. FIG. 2B shows another perspective view of first car 102, consistent with one or more exemplary embodiments of the present disclosure. FIG. 2C shows another perspective view of first car 102, consistent with one or more exemplary embodiments of the present disclosure. FIG. 2D shows a top view of first car 102, consistent with one or more exemplary embodiments of the present disclosure. FIG. 2E shows a side view of first car 102, consistent with one or more exemplary embodiments of the present disclosure. In an exemplary embodiment, first car 102 may be configured to move back and forth along a first axis 104. In an exemplary embodiment, system 100 may further include a first winch 202. In an exemplary embodiment, first winch 202 may be connected to first car 102. In an exemplary embodiment, as shown in FIG. 2A, FIG. 2B, FIG. 2C, and FIG. 2D, first winch 202 may be attached to an external side of first car 102. FIG. 2F shows a top view of system 100, consistent with one or more exemplary embodiments of the present disclosure. FIG. 2G shows a top view of system 100, consistent with one or more exemplary embodiments of the present disclosure. As shown in FIG. 2F, in an exemplary embodiment, first winch 202 may be fixedly attached to a distal end of first rail 101. In an exemplary embodiment, first car 102 may include a first wagon. In an exemplary embodiment, the first wagon may refer to a vehicle which may be used for transporting goods. In an exemplary embodiment, first winch 202 may be disposed inside the first wagon of first car 102. In an exemplary embodiment, system 100 may further include a first cable 106. In an exemplary embodiment, first cable 106 may be interconnected between first car 102 and a balloon 110. In an exemplary embodiment, a first end 162 of first cable 106 may be attached to balloon 110. As shown in FIG. 1A, in an exemplary embodiment, first end 162 of first cable 106 may be attached to balloon 110 by utilizing a multi-rope mechanism. In an exemplary embodiment, by using the multi-rope mechanism, the stress from first cable 106 may distribute on a larger surface of balloon 110. In an exemplary embodiment, first end 162 of first cable 106 may be attached to a first side 112 of balloon 110. In an exemplary embodiment, first side 112 of balloon 110 may refer to a left hemisphere of balloon 110. In an exemplary embodiment, as shown in FIG. 2E, a second end 164 of first cable 106 may be connected to first winch 202. In an exemplary embodiment, a part of first cable 106 may be wrapped around first winch 202. In an exemplary embodiment, when first winch 202 rotates in a first rotational direction around a main axis 222 of first winch 202, a first length 166 of first cable 106 between first car 102 and balloon 110 may increase which may lead to ascent of balloon 110. For example, when first winch 202 rotates in a counterclockwise direction around main axis 222 of first winch 202, a part of wrapped cable around first winch 202 may be released and added to first length 166 of first cable 106 between first car 102 and balloon 110. In an exemplary embodiment, when first winch 202 rotates in a second rotational direction around main axis 222 of first winch 202, first length 166 of first cable 106 between first car 102 and balloon 110 may decrease which may lead to descent of balloon 110. For example, when first winch 202 rotates in a clockwise direction around main axis 222 of first winch 202, a part of first cable 106 between first car 102 and balloon 110 may be wrapped around first winch 202 and, thereby, first length 166 of first cable 106 between first car 102 and balloon 110 may decrease.

Figure 3A:
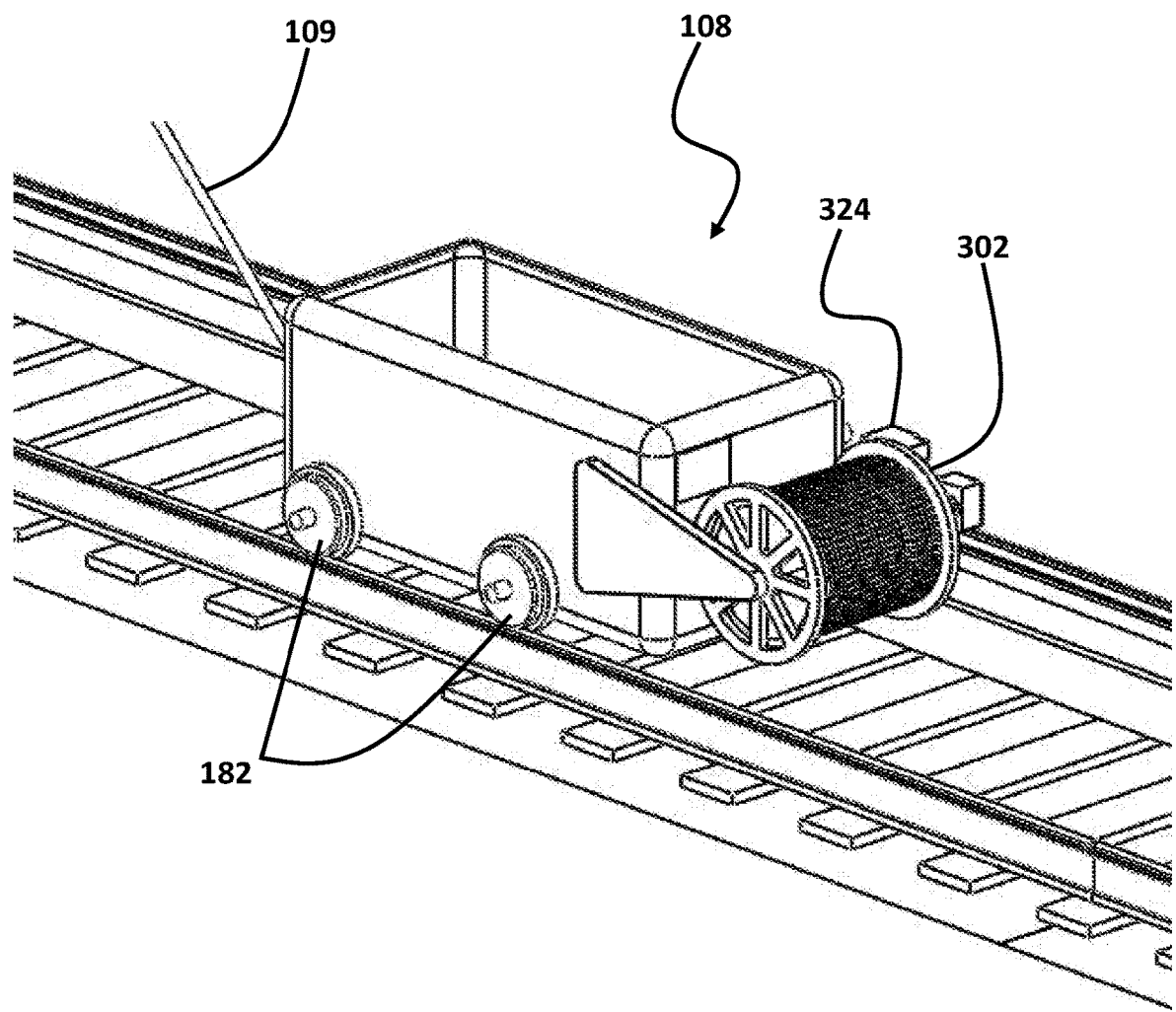
FIG. 3A illustrates a perspective view of a second car, consistent with one or more exemplary embodiments of the present disclosure.
Figure 3B:
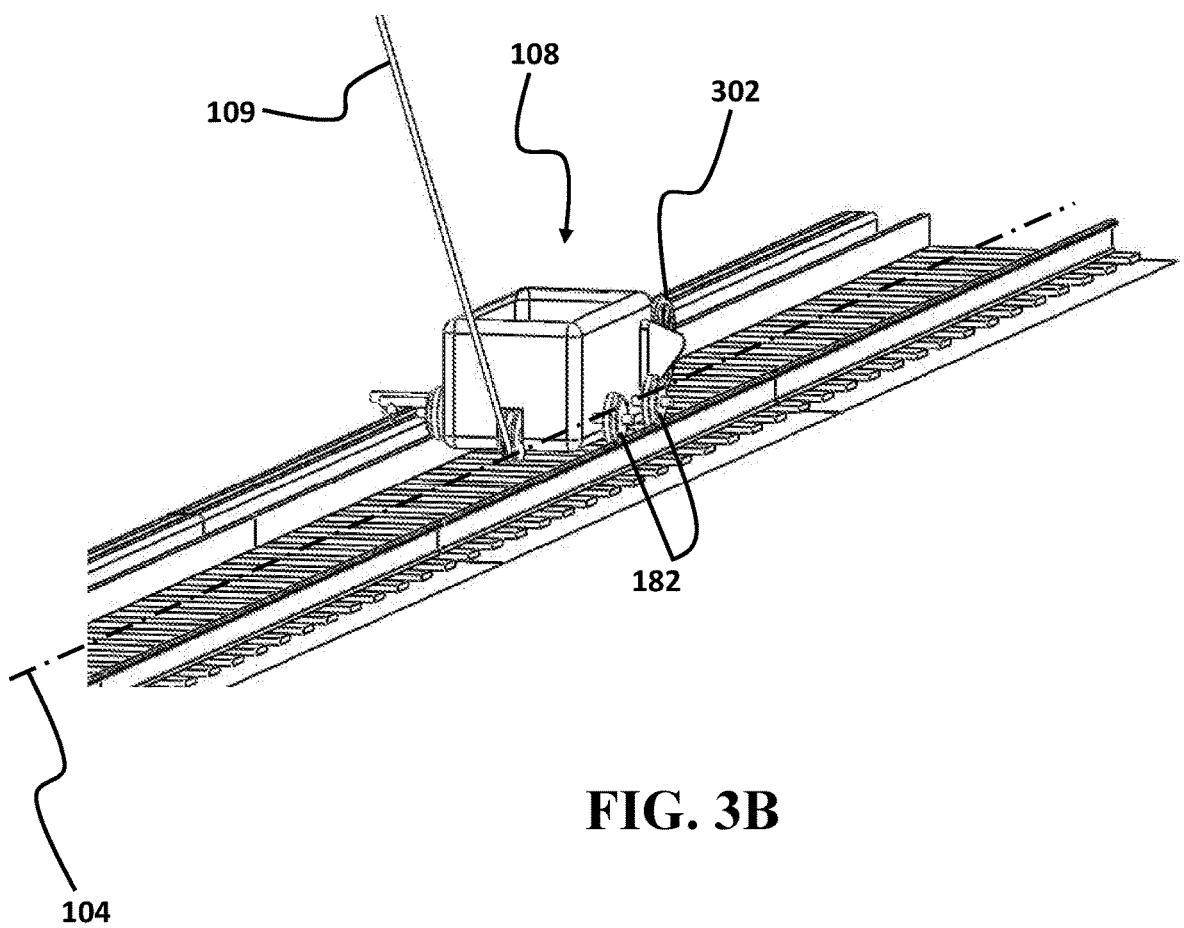
FIG. 3B illustrates another perspective view of the second car, consistent with one or more exemplary embodiments of the present disclosure.
Figure 3C:
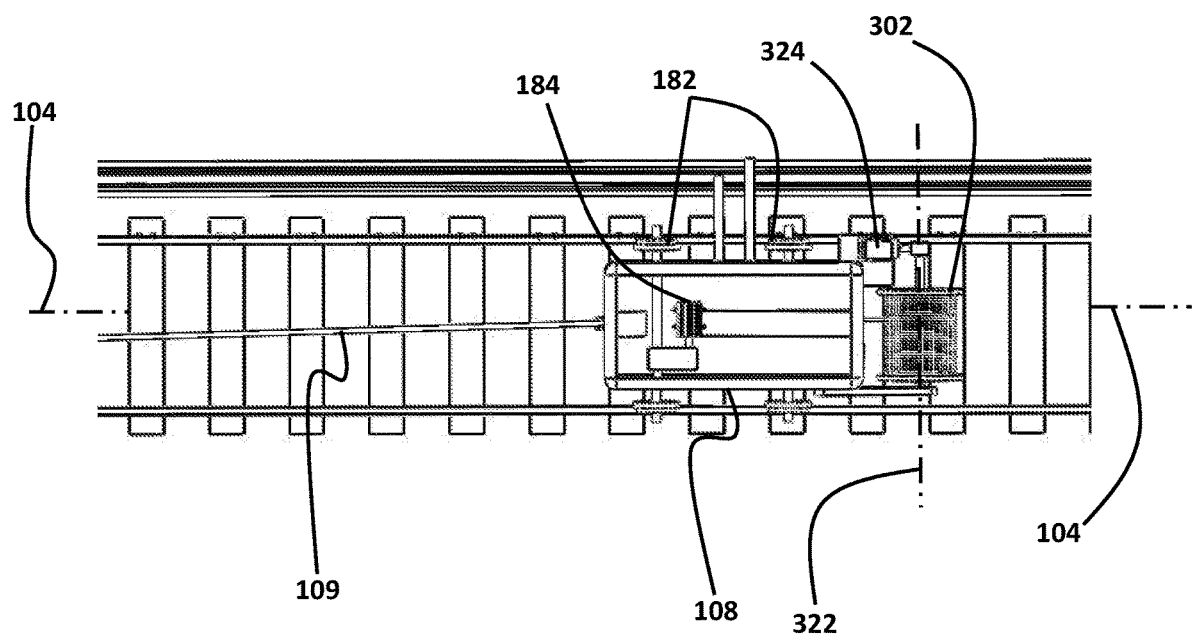
FIG. 3C illustrates a top view of a second car, consistent with one or more exemplary embodiments of the present disclosure.
Figure 3D:
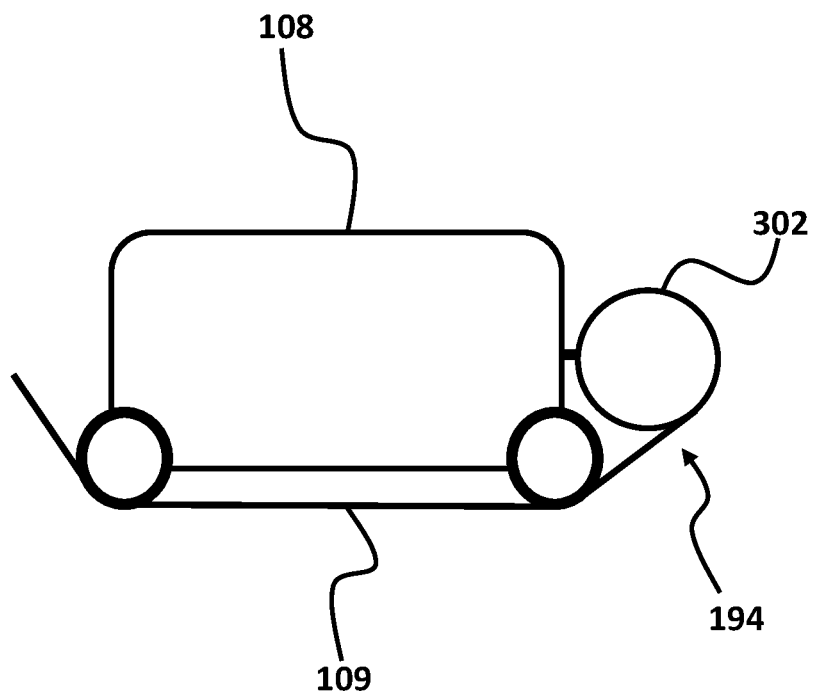
FIG. 3D illustrates a side view of a second car, consistent with one or more exemplary embodiments of the present disclosure.
Figure 3E:
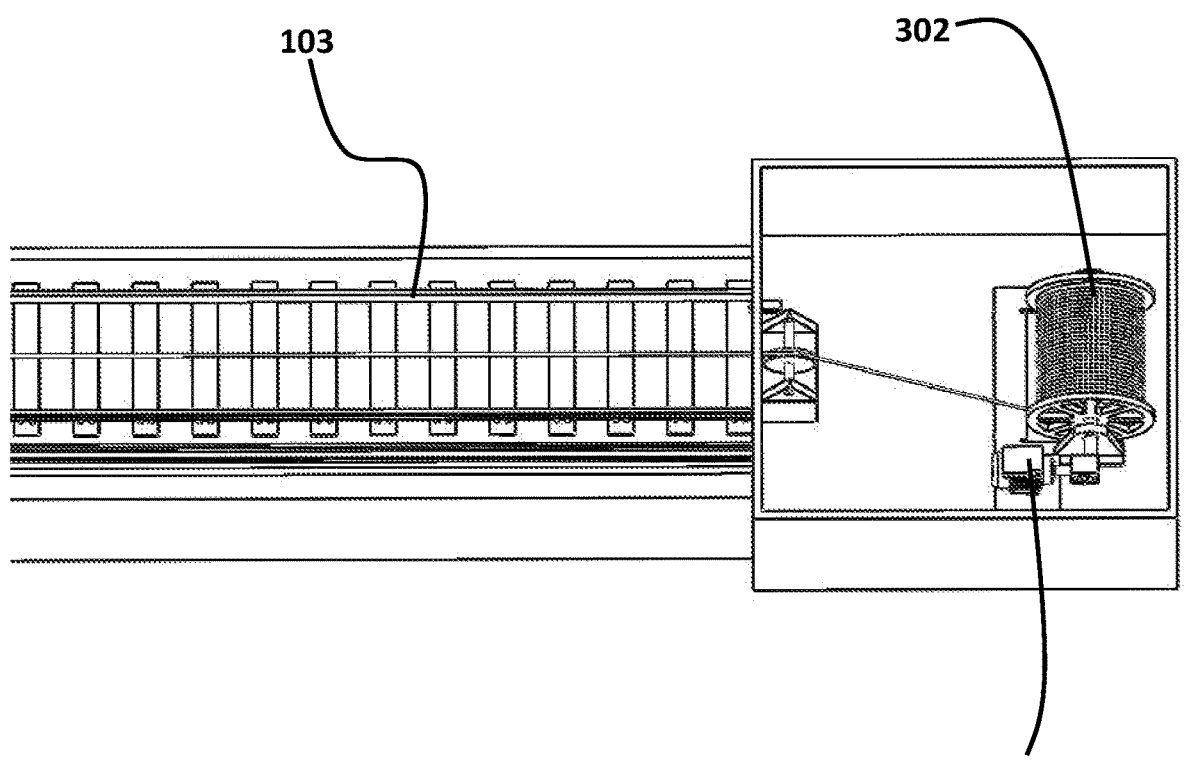
FIG. 3E illustrates a system, consistent with one or more exemplary embodiments of the present disclosure.
Figure 3F:
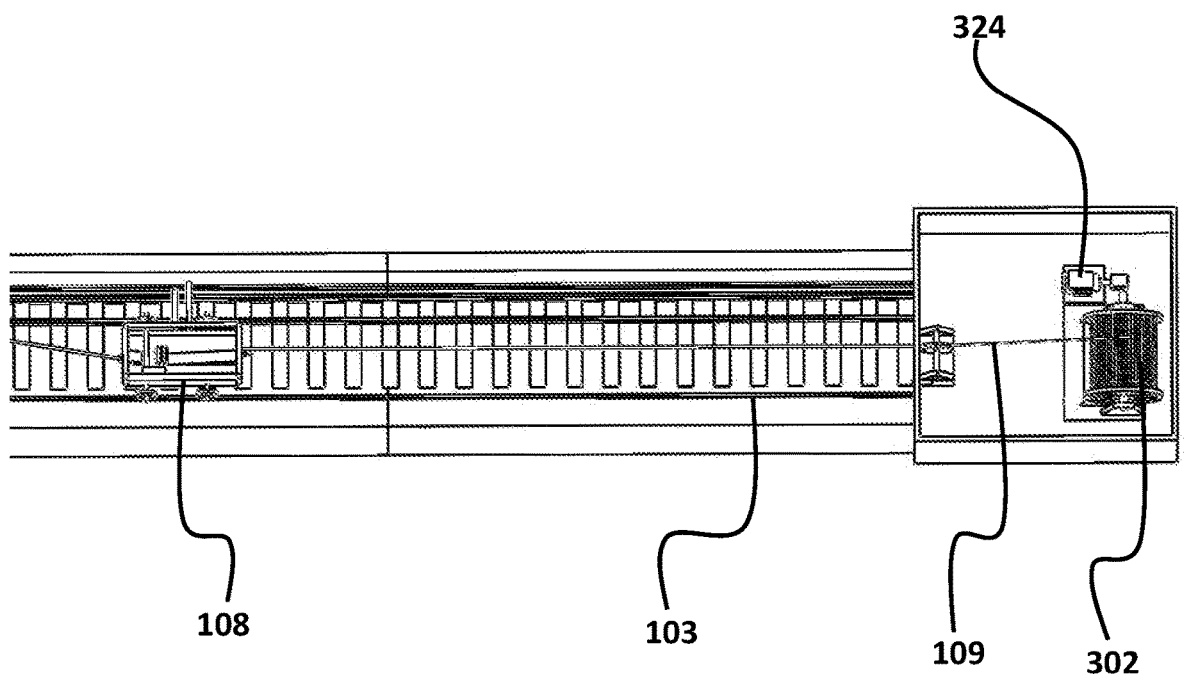
FIG. 3F illustrates a system, consistent with one or more exemplary embodiments of the present disclosure.

An exemplary system 100 may further include a second car 108. FIG. 3A shows a perspective view of second car 108, consistent with one or more exemplary embodiments of the present disclosure. FIG. 3B shows another perspective view of second car 108, consistent with one or more exemplary embodiments of the present disclosure. FIG. 3C shows a top view of second car 108, consistent with one or more exemplary embodiments of the present disclosure. FIG. 3D shows a side view of second car 108, consistent with one or more exemplary embodiments of the present disclosure. In an exemplary embodiment, second car 108 may be configured to move back and forth along first axis 104 similar to first car 102. In an exemplary embodiment, system 100 may further include a second winch 302. In an exemplary embodiment, second winch 302 may be connected to second car 108. In an exemplary embodiment, as shown in FIG. 3A, FIG. 3B, and FIG. 3C, second winch 302 may be attached to an external side of second car 108. FIG. 3E shows a top view of system 100, consistent with one or more exemplary embodiments of the present disclosure. FIG. 3F shows a top view of system 100, consistent with one or more exemplary embodiments of the present disclosure. As shown in FIG. 3E, in an exemplary embodiment, second winch 302 may be fixedly attached to a distal end of second rail 103. In an exemplary embodiment, second car 108 may include a second wagon. In an exemplary embodiment, the second wagon may refer to a vehicle which may be used for transporting goods. In an exemplary embodiment, second winch 302 may be disposed inside the second wagon of second car 108. In an exemplary embodiment, system 100 may further include a second cable 109. In an exemplary embodiment, second cable 109 may be interconnected between second car 108 and balloon 110. In an exemplary embodiment, a first end 192 of second cable 109 may be attached to balloon 110. As shown in FIG. 1A, in an exemplary embodiment, first end 192 of second cable 109 may be attached to balloon 110 by utilizing a multi-rope mechanism. In an exemplary embodiment, by using the multi-rope mechanism, the stress from second cable 109 may distribute on a larger surface of balloon 110. In an exemplary embodiment, first end 192 of second cable 109 may be attached to a second side 114 of balloon 110. In an exemplary embodiment, second side 114 of balloon 110 may refer to a right hemisphere of balloon 110. In an exemplary embodiment, as specifically shown in FIG. 3D, a second end 194 of second cable 109 may be connected to second winch 302. In an exemplary embodiment, a part of second cable 109 may be wrapped around second winch 302. In an exemplary embodiment, when second winch 302 rotates in a third rotational direction around a main axis 322 of second winch 302, a second length 196 of second cable 109 between second car 108 and balloon 110 may increase which may lead to ascent of balloon 110. For example, when second winch 302 rotates in a clockwise direction around main axis 322 of second winch 302, a part of wrapped cable around second winch 302 may be released and added to second length 196 of second cable 109 between second car 108 and balloon 110. In an exemplary embodiment, when second winch 302 rotates in a fourth rotational direction around main axis 322 of second winch 302, second length 196 of second cable 109 between second car 108 and balloon 110 may decrease which may lead to descent of balloon 110. For example, when second winch 302 rotates in a counterclockwise direction around main axis 322 of second winch 302, a part of second cable 109 between second car 108 and balloon 110 may be wrapped around second winch 302 and, thereby, second length 196 of second cable 109 between second car 108 and balloon 110 may decrease.

As shown in FIG. 1A and FIG. 1B, in an exemplary embodiment, system 100 may further include a first rail 101 associated with first car 102. In an exemplary embodiment, first rail 101 may guide first car 102 to move along first axis 104. Specifically, in an exemplary embodiment, first car 102 may include a first plurality of wheels 122 at a bottom of first car 102. In an exemplary embodiment, first car 102 may be disposed onto first rail 101. In an exemplary embodiment, first plurality of wheels 122 may be configured to be engaged with first rail 101 when first car 102 is disposed onto first rail 101. In an exemplary embodiment, a main axis of first rail 101 may be aligned with first axis 104 in such a way that first rail 101 limits movements of first car 102 to a linear back and forth movement along first axis 101.

As further shown in FIG. 2C and FIG. 2D, in an exemplary embodiment, first car 102 may further include a first motor 124. In an exemplary embodiment, first motor 124 may be connected to first plurality of wheels 122. In an exemplary embodiment, first motor 124 may be configured to urge first car 102 to move along first axis 104 in a first direction 142 and/or in a second direction 144. As shown in FIG. 2A, FIG. 2B, FIG. 2C, FIG. 2D, and FIG. 2F, system 100 may further include a first winch motor 224. In an exemplary embodiment, first winch motor 224 may be connected to first winch 202. In an exemplary embodiment, first winch motor 224 may be configured to urge first winch 202 to rotate around main axis 222 of first winch 202 in a clockwise direction and/or in a counterclockwise direction.

In an exemplary embodiment, system 100 may also include a second rail 103 associated with second car 108. In an exemplary embodiment, second car 108 may include a second plurality of wheels 182 at a bottom of second car 108. In an exemplary embodiment, second car 108 may be disposed onto second rail 103. In an exemplary embodiment, second plurality of wheels 182 may be configured to be engaged with second rail 103 when second car 108 is disposed onto second rail 103. In an exemplary embodiment, a main axis of second rail 103 may be aligned with first axis 104 in such a way that second rail 103 may limit movements of second car 108 to a linear back and forth movement along first axis 101.

As further shown in FIG. 3C, in an exemplary embodiment, second car 108 may further include a second motor 184. In an exemplary embodiment, second motor 184 may be connected to second plurality of wheels 182. In an exemplary embodiment, second motor 184 may be configured to urge second car 108 to move along first axis 104 in first direction 142 and/or in second direction 144. That is, motor may move second plurality of wheels 182. As shown in FIG. 3A, FIG. 3C, and FIG. 3E, system 100 may further include a second winch motor 324. In an exemplary embodiment, second winch motor 324 may be connected to second winch 302. In an exemplary embodiment, second winch motor 324 may be configured to urge second winch 302 to rotate around main axis 322 of second winch 302 in a clockwise direction and/or in a counterclockwise direction.

In an exemplary embodiment, system 100 may further include one or more processors 150. In an exemplary embodiment, one or more processors 150 may be connected to first car 102, second car 108, first winch 202, and second winch 302. In an exemplary embodiment, one or more processors 150 may control movements of first car 102, second car 108, first winch 202, and second winch 302. In an exemplary embodiment, as shown in FIG. 1B, a first angle 168 may be formed between first axis 104 and a main longitudinal axis of first cable 106. In an exemplary embodiment, as further shown in FIG. 1B, a second angle 198 may be formed between first axis 104 and a main longitudinal axis of second cable 109. In an exemplary embodiment, one or more processors 150 may control speed of first car 102, second car 108, first winch 202, and second winch 302 in such a way that first angle 168 and second angle 198 remain constant during ascent and/or descent of balloon 110.

Figure 4A:
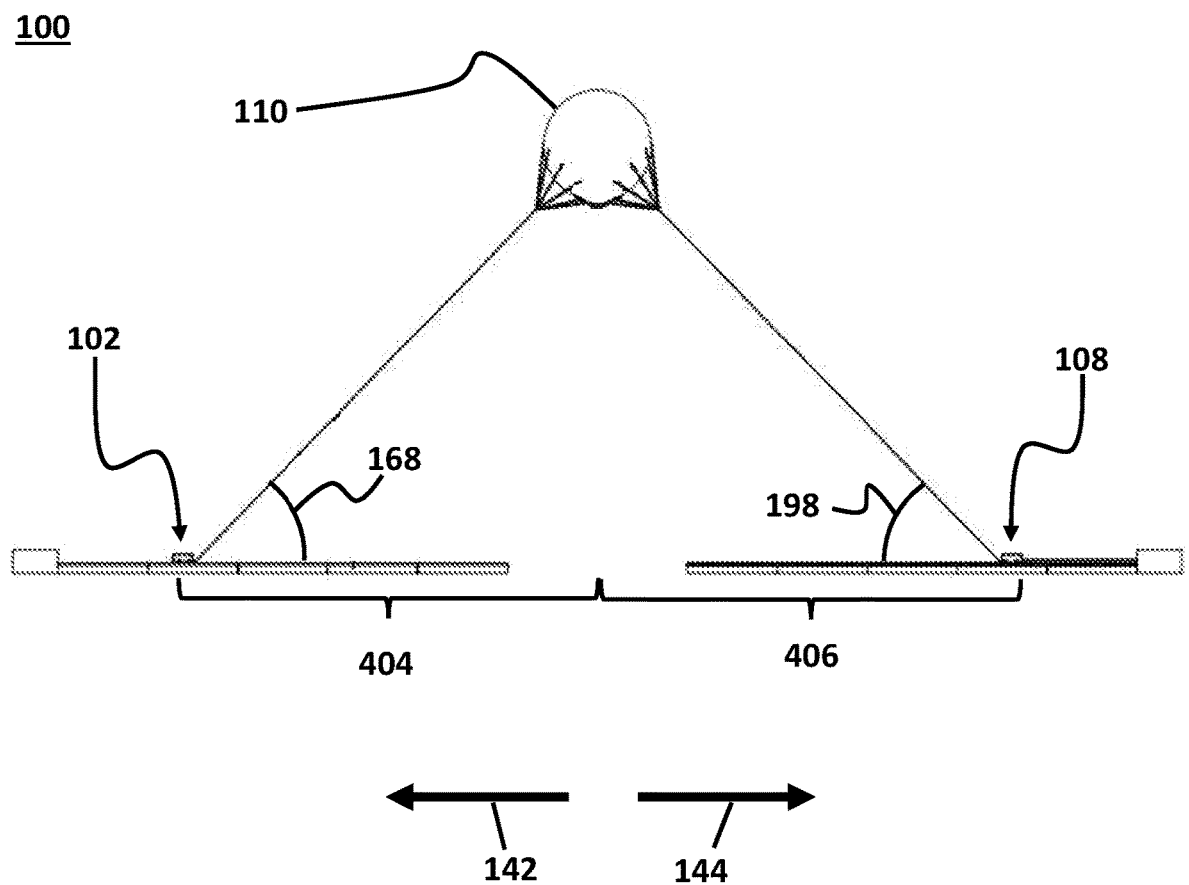
FIG. 4A illustrates a side view of a system for ascent and descent of a balloon, consistent with one or more exemplary embodiments of the present disclosure.

FIG. 4A shows a side view of system 100, consistent with one or more exemplary embodiments of the present disclosure. As shown in FIG. 4A, in an exemplary embodiment, when it is intended to ascend balloon 110, first car 102 may move in first direction 142 and second car 108 may move in second direction 144.

In an exemplary embodiment, simultaneously with moving first car 102 in first direction 142, first winch 202 may be rotated in a counterclockwise direction so that more parts of first cable 106 may be unwrapped from first winch 202 and, thereby, first length 166 of first cable 106 may increase. In an exemplary embodiment, one or more processors 150 may adjust the ratio between linear speed of first car 102 and rotational speed of first winch 202 in such a way that first angle 168 remains constant. In an exemplary embodiment, in order to keep first angle 168 constant, a ratio between first horizontal distance 404 and first length 166 of first cable 106 may be kept equal to cosine of first angle 168. In an exemplary embodiment, one or more processors 150 may adjust linear speed of first car 102 and rotational speed of first winch 202 in such a way that the ratio between first horizontal distance 404 and first length 166 of first cable 106 is kept equal to cosine of first angle 168. In an exemplary embodiment, in order to keep the ratio between first horizontal distance 404 and first length 166 of first cable 106 equal to cosine of first angle 168, a ratio between increase rate of first horizontal distance 404 and increase rate of first length 166 of first cable 106 may be kept equal to cosine of first angle 168.

In an exemplary embodiment, simultaneously with moving second car 108 in second direction 144, second winch 302 may be rotated in a clockwise direction so that more parts of second cable 109 may be unwrapped from second winch 302 and, thereby, second length 196 of second cable 109 may increase. In an exemplary embodiment, one or more processors 150 may adjust the ratio between linear speed of second car 108 and rotational speed of second winch 302 in such a way that second angle 198 remains constant. In an exemplary embodiment, in order to keep second angle 198 constant, a ratio between second horizontal distance 406 and second length 196 of second cable 109 may be kept equal to cosine of second angle 198. In an exemplary embodiment, one or more processors 150 may adjust linear speed of second car 108 and rotational speed of second winch 302 in such a way that the ratio between second horizontal distance 406 and second length 196 of second cable 109 is kept equal to cosine of second angle 198. In an exemplary embodiment, in order to keep the ratio between second horizontal distance 406 and second length 196 of second cable 109 equal to cosine of second angle 198, a ratio between increase rate of second horizontal distance 406 and increase rate of second length 196 of second cable 109 may be kept equal to cosine of second angle 198.

Figure 4B:
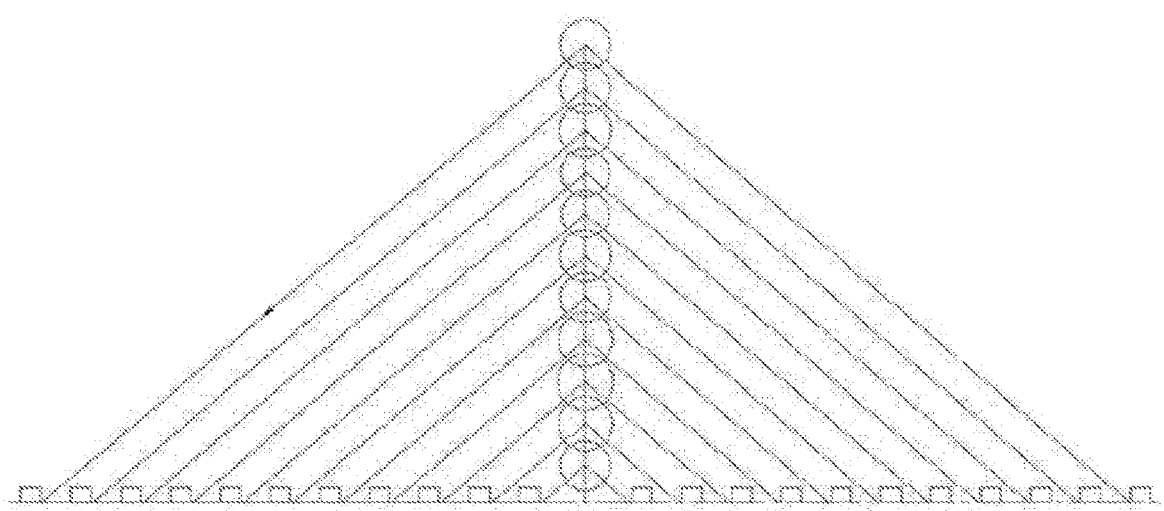
FIG. 4B illustrates a side view of a system for ascent and descent of a balloon at different heights, consistent with one or more exemplary embodiments of the present disclosure.

FIG. 4B shows a side view of system 100 at different heights, consistent with one or more exemplary embodiments of the present disclosure. As shown in FIG. 4B, by utilizing system 100 for ascent and descent of balloon 110, first angle 168 and second angle 198 may remain constant at different heights of balloon 110.

Figure 5:
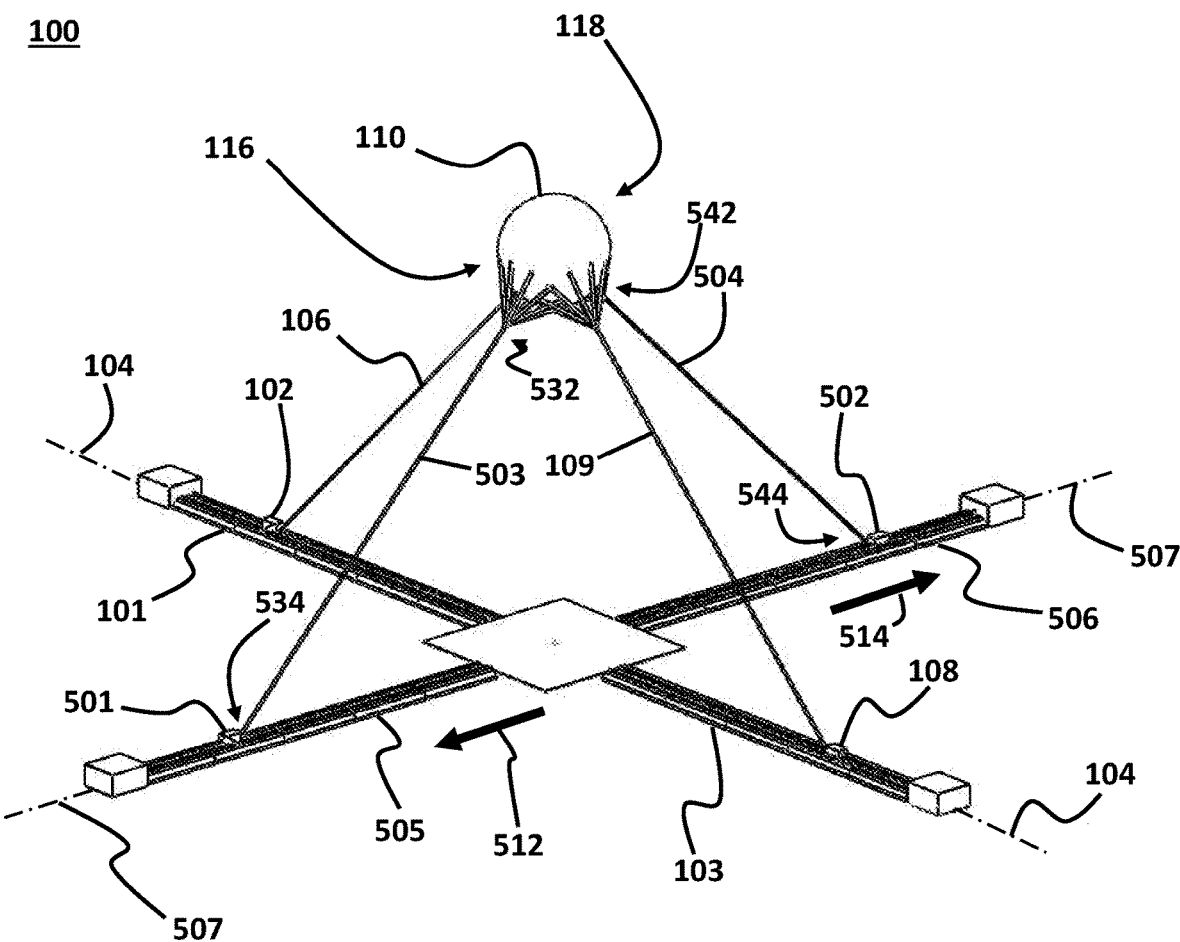
FIG. 5 illustrates a perspective view of a system, consistent with one or more exemplary embodiments of the present disclosure.

FIG. 5 shows a perspective view of system 100, consistent with one or more exemplary embodiments of the present disclosure. As shown in FIG. 5, in an exemplary embodiment, system 100 may further include a third car 501, a fourth car 502, a third cable 503, a fourth cable 504, a third rail 505, and a fourth rail 506. In an exemplary embodiment, third car 501 may be configured to move back and forth on third rail 505 and along a second axis 507 in a third direction 512 and/or a fourth direction 514. In an exemplary embodiment, second axis 507 may be perpendicular to first axis 104. In an exemplary embodiment, fourth car 502 may be configured to move back and forth on fourth rail 506 and along second axis 507 in third direction 512 and/or fourth direction 514.

In an exemplary embodiment, a first end 532 of third cable 503 may be attached to a third side 116 of balloon 110. In an exemplary embodiment, a second end 534 of third cable 503 may be attached to third car 501. In an exemplary embodiment, a first end 542 of fourth cable 504 may be attached to a fourth side 118 of balloon 110. In an exemplary embodiment, a second end 544 of fourth cable 504 may be attached to fourth car 502. In an exemplary embodiment, third car 501 and fourth car 502 may be similar to first car 102 and second car 108 in structure and functionality. In an exemplary embodiment, third rail 505 and fourth rail 506 May be similar to first rail 101 and second rail 103 in structure and functionality. In an exemplary embodiment, more number of cars and rails may be utilized. For example, five cars with five rails may be utilized in such a way that an angle between each two successive rails is 72°.

In an exemplary embodiment, system 100 may be utilized for balancing and controlling an exemplary balloon. In an exemplary embodiment, a sensor may be used for measuring unbalancing of the balloon and then may send related data to one or more processors 150. Then, in an exemplary embodiment, one or more processors 150 may rotate one of the winches to balance the balloon. In an exemplary embodiment, by rotating one of the winches, a torque may be applied to the balloon, and thereby, the balloon may be balanced.

Figure 6:
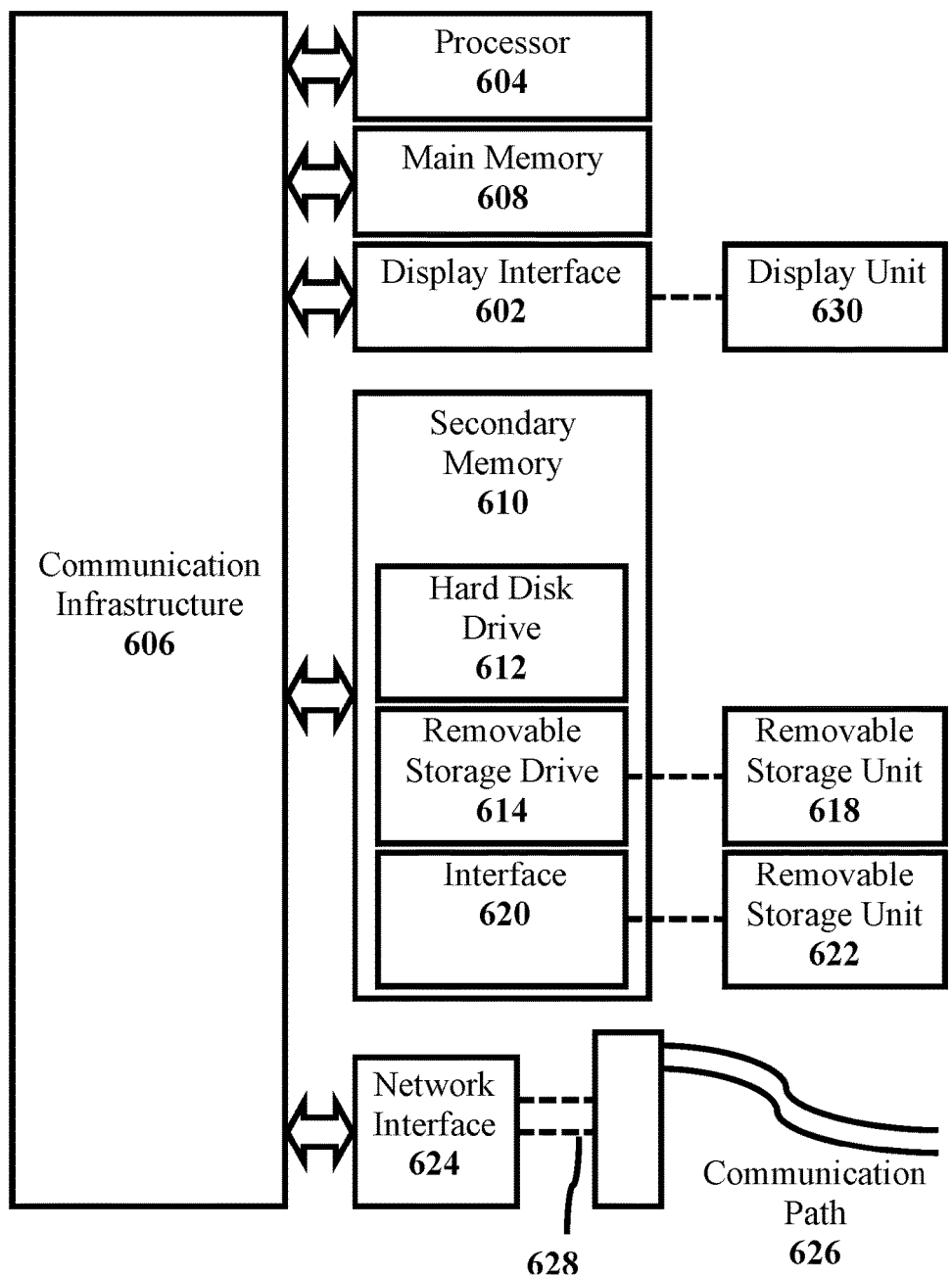
FIG. 6 illustrates an exemplary embodiment of a processing unit, consistent with one or more exemplary embodiments of the present disclosure.

FIG. 6 shows an exemplary embodiment of a processing unit 600 in which an exemplary embodiment of the present disclosure, or portions thereof, may be implemented as computer-readable code, consistent with one or more exemplary embodiments of the present disclosure. For example, an exemplary balloon may be associated with processing unit 600 using hardware, software, firmware, tangible computer readable media having instructions stored thereon, or a combination thereof and may be implemented in one or more computer systems or other processing systems. In an exemplary embodiment, the one or more processors 150 as discussed with respect to FIG. 1A and FIG. 1B may be similar to processing unit 600 of FIG. 6.

If programmable logic is used, such logic may execute on a commercially available processing platform or a special purpose device. One of ordinary skill in the art may appreciate that an exemplary embodiment of the disclosed subject matter can be practiced with various computer system configurations, including multi-core multiprocessor systems, minicomputers, mainframe computers, computers linked or clustered with distributed functions, as well as microcontrollers, pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An exemplary embodiment of the present disclosure is described in terms of this example processing unit 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general-purpose processor device. As will be appreciated by persons skilled in the relevant art, processor device 604 may also be a single processor in a multi-core/multiprocessor system, such system operating alone, or in a cluster of computing devices operating in a cluster or server farm. In an exemplary embodiment, processor device 604 may be connected to a communication infrastructure 606, for example, a bus, message queue, network, or multi-core message-passing scheme.

In an exemplary embodiment, processing unit 600 may also include a main memory 608, for example, random access memory (RAM), and may also include a secondary memory 610. In an exemplary embodiment, secondary memory 610 may include a hard disk drive 612, and a removable storage drive 614. In an exemplary embodiment, removable storage drive 614 may include a floppy disk drive, a magnetic tape drive, an optical disk drive, a flash memory, or the like. In addition, removable storage drive 614 may read from and/or write to a removable storage unit 618 in a well-known manner. In an exemplary embodiment, removable storage unit 618 may include a floppy disk, magnetic tape, optical disk, etc., which may be read by and written to by removable storage drive 614. As will be appreciated by persons skilled in the relevant art, removable storage unit 618 may include a computer usable storage medium having stored therein computer software and/or data.

In alternative implementations, secondary memory 610 may include other similar means for allowing computer programs or other instructions to be loaded into one or more processors 150. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from removable storage unit 622 to processing unit 600.

In an exemplary embodiment, processing unit 600 may also include a communications interface 624. Communications interface 624 may allow software and data to be transferred between processing unit 600 and external devices. In an exemplary embodiment, communications interface 624 may include a modem, a network interface (such as an Ethernet card), a communications port, a PCM-CIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. In an exemplary embodiment, communications path 626 may carry signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g. DRAMs, etc.).

In some exemplary embodiment, computer programs (also called computer control logic) may be stored in main memory 608 and/or secondary memory 610. Computer programs may also be received via communications interface 624. Such computer programs, when executed, enable processing unit 600 to implement the present disclosure as discussed herein. In particular, the computer programs, when executed, may enable processor device 604 to implement the processes of the present disclosure. Accordingly, such computer programs represent controllers of processing unit 600. Where the present disclosure is implemented using software, the software may be stored in a computer program product and loaded into processing unit 600 using removable storage drive 614, interface 620, and hard disk drive 612, or communications interface 624.

Embodiments of the present disclosure may also be directed to computer program products including software stored on any computer useable medium. Such software, when executed in one or more data processing devices, causes a data processing device(s) to operate as described herein. An exemplary embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective spaces of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A system for ascent and descent of a balloon, the system comprising:
    a first car configured to move back and forth along a first axis;
    a first winch associated with the first car;
    a first cable interconnected between the first car and the balloon, a first end of the first cable attached to the balloon, a second end of the first cable wrapped around the first winch, the first winch configured to:
        increase a first length of the first cable between the first car and the balloon responsive to rotating the first winch in a first rotational direction around a main axis of the first winch; and
        decrease the length of the first cable between the first car and the balloon responsive to rotating the first winch in a second rotational direction around the main axis of the first winch, the second rotational direction opposite the first rotational direction;
    a second car configured to move back and forth along the first axis;
    a second winch associated with the second car;
    a second cable interconnected between the second car and the balloon, a first end of the second cable attached to the balloon, a second end of the second cable wrapped around the second winch, the second winch configured to:
        increase a second length of the second cable between the second car and the balloon responsive to rotating the second winch in a third rotational direction around a main axis of the second winch; and
        decrease the second length of the second cable between the second car and the balloon responsive to rotating the second winch in a fourth rotational direction around the main axis of the second winch, the fourth rotational direction opposite the third rotational direction;
    a first rail, a main axis of the first rail aligned with the first axis, the first car comprising a first plurality of wheels attached to a bottom surface of the first car, the first plurality of wheels configured to be engaged with the first rail, the first car configured to move on the first rail, the first rail configured to limit movements of the first car to a linear movement along the first axis;
    a second rail, a main axis of the second rail aligned with the first axis, the second car comprising a second plurality of wheels attached to a bottom surface of the second car, the second plurality of wheels configured to be engaged with the second rail, the second car configured to move on the second rail, the second rail configured to limit movements of the second car to a linear movement along the first axis;
    a memory having process-readable instructions stored therein; and
    one or more processors configured to access the memory and execute the processor-readable instructions, which, when executed by one or more processors configures the one or more processors to perform a method, the method comprising:
        ascending the balloon by:
            moving the first car along the first axis and in a first direction;
            rotating the first winch in the first rotational direction around the main axis of the first winch;
            moving the second car along the first axis and in a second direction, the second direction opposite the first direction; and
            rotating the second winch in the third rotational direction around the main axis of the second winch; and
        descending the balloon by:
            moving the first car along the first axis and in the second direction;
            rotating the first winch in the second rotational direction around the main axis of the first winch;
            moving the second car along the first axis and in the first direction; and
            rotating the second winch in the fourth rotational direction around the main axis of the second winch.

2. The system of claim 1, further comprising:
    a first winch motor, the first winch motor connected to the first winch, the first winch motor configured to urge the first winch to rotate around the main axis of the first winch; and
    a second winch motor, the second winch motor connected to the second winch, the second winch motor configured to urge the second winch to rotate around the main axis of the second winch.

3. The system of claim 2, wherein:
    the first car comprises:
        a first wagon; and
        a first motor, the first motor disposed inside the first wagon, the first motor configured to urge the first car to move along the first axis, and
    the second car comprises:
        a second wagon; and
        a second motor, the second motor disposed inside the second wagon, the second motor configured to urge the second car to move along the first axis.

4. The system of claim 3, wherein:
    the second end of the first cable is attached to a first side of the balloon; and
    the second end of the second cable is attached to a second side of the balloon, the first side of the balloon opposite the second side of the balloon.

5. The system of claim 4, wherein:
    the first winch is attached to an external side of the first wagon; and
    the second winch is attached to an external side of the second wagon.

6. The system of claim 4, wherein:
    the first winch is fixedly attached to the first rail at a distal end of the first rail; and
    the second winch is fixedly attached to the second rail at a distal end of the second rail.

7. The system of claim 5, further comprising:
    a third car configured to move back and forth along a second axis;
    a third winch associated with the third car;

a third cable interconnected between the third car and the balloon, a first end of the third cable attached to the balloon, a second end of the third cable wrapped around the third winch, the third winch configured to:
   increase a third length of the third cable between the third car and the balloon responsive to rotating the third winch in a fifth rotational direction around a main axis of the third winch; and
   decrease the third length of the third cable between the third car and the balloon responsive to rotating the third winch in a sixth rotational direction around the main axis of the third winch, the sixth rotational direction opposite the fifth rotational direction;
a fourth car configured to move back and forth along the second axis;
a fourth winch associated with the fourth car;
a fourth cable interconnected between the fourth car and the balloon, a first end of the fourth cable attached to the balloon, a second end of the fourth cable wrapped around the fourth winch, the fourth winch configured to:
   increase a fourth length of the fourth cable between the fourth car and the balloon responsive to rotating the fourth winch in a seventh rotational direction around a main axis of the fourth winch; and
   decrease the fourth length of the fourth cable between the fourth car and the balloon responsive to rotating the fourth winch in an eighth rotational direction around the main axis of the fourth winch, the eighth rotational direction opposite the seventh rotational direction;
wherein:
   ascending the balloon further comprises:
      moving the third car along the second axis and in a third direction;
      rotating the third winch in the fifth rotational direction around the main axis of the third winch;
      moving the fourth car along the second axis and in a fourth direction, the fourth direction opposite the third direction; and
      rotating the fourth winch in the seventh rotational direction around the main axis of the fourth winch; and
   descending the balloon further comprises:
      moving the third car along the second axis and in the fourth direction;
      rotating the third winch in the sixth rotational direction around the main axis of the third winch;
      moving the fourth car along the second axis and in the third direction; and
      rotating the fourth winch in the eighth rotational direction around the main axis of the fourth winch.

8. The system of claim 7, wherein the second axis is perpendicular to the first axis.

9. The system of claim 8, further comprising:
a third rail, a main axis of the third rail aligned with the second axis, the third car comprising a third plurality of wheels attached to a bottom surface of the third car, the third plurality of wheels configured to be engaged with the third rail, the third car configured to move on the third rail; and
a fourth rail, a main axis of the fourth rail aligned with the second axis, the fourth car comprising a fourth plurality of wheels attached to a bottom surface of the fourth car, the fourth plurality of wheels configured to be engaged with the second rail, the fourth car configured to move on the fourth rail;
wherein:
   the third rail is configured to limit movements of the third car to a linear movement along the second axis; and
   the fourth rail is configured to limit movements of the fourth car to a linear movement along the second axis.

10. The system of claim 9, further comprising:
a third winch motor, the third winch motor connected to the third winch, the third winch motor configured to urge the third winch to rotate around the main axis of the third winch; and
a fourth winch motor, the fourth winch motor connected to the fourth winch, the fourth winch motor configured to urge the fourth winch to rotate around the main axis of the fourth winch.

11. The system of claim 10, wherein:
the third car comprises:
   a third wagon; and
   a third motor, the third motor disposed inside the third wagon, the third motor configured to urge the third car to move along the second axis, and
the fourth car comprises:
   a fourth wagon; and
   a fourth motor, the fourth motor disposed inside the fourth wagon, the fourth motor configured to urge the fourth car to move along the second axis.

12. The system of claim 11, wherein:
the second end of the third cable is attached to a third side of the balloon; and
the second end of the fourth cable is attached to a fourth side of the balloon, the fourth side of the balloon opposite the third side of the balloon.

13. The system of claim 12, wherein:
the third winch is attached to an external side of the third wagon; and
the fourth winch is attached to an external side of the fourth wagon.

14. The system of claim 13, wherein:
the third winch is fixedly attached to the third rail at a distal end of the third rail; and
the fourth winch is fixedly attached to the fourth rail at a distal end of the fourth rail.

15. A system for ascent and descent of a balloon, the system comprising:
a first car configured to move back and forth along a first axis, the first car comprising:
   a first wagon; and
   a first motor, the first motor disposed inside the first wagon, the first motor configured to urge the first car to move along the first axis;
a first winch associated with the first car;
a first cable interconnected between the first car and the balloon, a first end of the first cable attached to the balloon, a second end of the first cable wrapped around the first winch, the second end of the first cable attached to a first side of the balloon, the first winch configured to:
   increase a first length of the first cable between the first car and the balloon responsive to rotating the first winch in a first rotational direction around a main axis of the first winch; and
   decrease the length of the first cable between the first car and the balloon responsive to rotating the first winch in a second rotational direction around the main axis of the first winch, the second rotational direction opposite the first rotational direction;

a second car configured to move back and forth along the first axis, the second car comprising:
  a second wagon; and
  a second motor, the second motor disposed inside the second wagon, the second motor configured to urge the second car to move along the first axis;
a second winch associated with the second car;
a second cable interconnected between the second car and the balloon, a first end of the second cable attached to the balloon, a second end of the second cable wrapped around the second winch, the second end of the second cable attached to a second side of the balloon, the first side of the balloon opposite the second side of the balloon the second winch configured to:
  increase a second length of the second cable between the second car and the balloon responsive to rotating the second winch in a third rotational direction around a main axis of the second winch; and
  decrease the second length of the second cable between the second car and the balloon responsive to rotating the second winch in a fourth rotational direction around the main axis of the second winch, the fourth rotational direction opposite the third rotational direction;
a first rail, a main axis of the first rail aligned with the first axis, the first car comprising a first plurality of wheels attached to a bottom surface of the first car, the first plurality of wheels configured to be engaged with the first rail, the first car configured to move on the first rail, the first rail configured to limit movements of the first car to a linear movement along the first axis, the first winch fixedly attached to the first rail at a distal end of the first rail;
a second rail, a main axis of the second rail aligned with the first axis, the second car comprising a second plurality of wheels attached to a bottom surface of the second car, the second plurality of wheels configured to be engaged with the second rail, the second car configured to move on the second rail, the second rail configured to limit movements of the second car to a linear movement along the first axis, the second winch fixedly attached to the second rail at a distal end of the second rail;
a first winch motor, the first winch motor connected to the first winch, the first winch motor configured to urge the first winch to rotate around the main axis of the first winch;
a second winch motor, the second winch motor connected to the second winch, the second winch motor configured to urge the second winch to rotate around the main axis of the second winch;
a third car configured to move back and forth along a second axis, the second axis perpendicular to the first axis, the third car comprising:
  a third wagon; and
  a third motor, the third motor disposed inside the third wagon, the third motor configured to urge the third car to move along the second axis;
a third winch associated with the third car;
a third cable interconnected between the third car and the balloon, a first end of the third cable attached to the balloon, a second end of the third cable wrapped around the third winch, the second end of the third cable attached to a third side of the balloon, the third winch configured to:
  increase a third length of the third cable between the third car and the balloon responsive to rotating the third winch in a fifth rotational direction around a main axis of the third winch; and
  decrease the third length of the third cable between the third car and the balloon responsive to rotating the third winch in a sixth rotational direction around the main axis of the third winch, the sixth rotational direction opposite the fifth rotational direction;
a fourth car configured to move back and forth along the second axis, the fourth car comprising:
  a fourth wagon; and
  a fourth motor, the fourth motor disposed inside the fourth wagon, the fourth motor configured to urge the fourth car to move along the second axis;
a fourth winch associated with the fourth car;
a fourth cable interconnected between the fourth car and the balloon, a first end of the fourth cable attached to the balloon, a second end of the fourth cable wrapped around the fourth winch, the second end of the fourth cable attached to a fourth side of the balloon, the fourth side of the balloon opposite the third side of the balloon, the fourth winch configured to:
  increase a fourth length of the fourth cable between the fourth car and the balloon responsive to rotating the fourth winch in a seventh rotational direction around a main axis of the fourth winch; and
  decrease the fourth length of the fourth cable between the fourth car and the balloon responsive to rotating the fourth winch in an eighth rotational direction around the main axis of the fourth winch, the eighth rotational direction opposite the seventh rotational direction;
a third rail, a main axis of the third rail aligned with the second axis, the third car comprising a third plurality of wheels attached to a bottom surface of the third car, the third plurality of wheels configured to be engaged with the third rail, the third car configured to move on the third rail, the third rail configured to limit movements of the third car to a linear movement along the second axis, the third winch fixedly attached to the third rail at a distal end of the third rail;
a fourth rail, a main axis of the fourth rail aligned with the second axis, the fourth car comprising a fourth plurality of wheels attached to a bottom surface of the fourth car, the fourth plurality of wheels configured to be engaged with the second rail, the fourth car configured to move on the fourth rail, the fourth rail configured to limit movements of the fourth car to a linear movement along the second axis, the fourth winch fixedly attached to the fourth rail at a distal end of the fourth rail;
a third winch motor, the third winch motor connected to the third winch, the third winch motor configured to urge the third winch to rotate around the main axis of the third winch;
a fourth winch motor, the fourth winch motor connected to the fourth winch, the fourth winch motor configured to urge the fourth winch to rotate around the main axis of the fourth winch;
a memory having process-readable instructions stored therein; and
one or more processors configured to access the memory and execute the processor-readable instructions, which, when executed by one or more processors configures the one or more processors to perform a method, the method comprising:
  ascending the balloon by:
    moving the first car along the first axis and in a first direction;

rotating the first winch in the first rotational direction around the main axis of the first winch;
moving the second car along the first axis and in a second direction, the second direction opposite the first direction;
rotating the second winch in the third rotational direction around the main axis of the second winch;
moving the third car along the second axis and in a third direction;
rotating the third winch in the fifth rotational direction around the main axis of the third winch;
moving the fourth car along the second axis and in a fourth direction, the fourth direction opposite the third direction; and
rotating the fourth winch in the seventh rotational direction around the main axis of the fourth winch; and
descending the balloon by:
moving the first car along the first axis and in the second direction;
rotating the first winch in the second rotational direction around the main axis of the first winch;
moving the second car along the first axis and in the first direction;
rotating the second winch in the fourth rotational direction around the main axis of the second winch;
moving the third car along the second axis and in the fourth direction;
rotating the third winch in the sixth rotational direction around the main axis of the third winch;
moving the fourth car along the second axis and in the third direction; and
rotating the fourth winch in the eighth rotational direction around the main axis of the fourth winch.

16. A system for ascent and descent of a balloon, the system comprising:
a first car configured to move back and forth along a first axis, the first car comprising:
a first wagon; and
a first motor, the first motor disposed inside the first wagon, the first motor configured to urge the first car to move along the first axis;
a first winch associated with the first car;
a first cable interconnected between the first car and the balloon, a first end of the first cable attached to the balloon, a second end of the first cable wrapped around the first winch, the second end of the first cable attached to a first side of the balloon, the first winch configured to:
increase a first length of the first cable between the first car and the balloon responsive to rotating the first winch in a first rotational direction around a main axis of the first winch; and
decrease the length of the first cable between the first car and the balloon responsive to rotating the first winch in a second rotational direction around the main axis of the first winch, the second rotational direction opposite the first rotational direction;
a second car configured to move back and forth along the first axis, the second car comprising:
a second wagon; and
a second motor, the second motor disposed inside the second wagon, the second motor configured to urge the second car to move along the first axis;
a second winch associated with the second car;
a second cable interconnected between the second car and the balloon, a first end of the second cable attached to the balloon, a second end of the second cable wrapped around the second winch, the second end of the second cable attached to a second side of the balloon, the first side of the balloon opposite the second side of the balloon the second winch configured to:
increase a second length of the second cable between the second car and the balloon responsive to rotating the second winch in a third rotational direction around a main axis of the second winch; and
decrease the second length of the second cable between the second car and the balloon responsive to rotating the second winch in a fourth rotational direction around the main axis of the second winch, the fourth rotational direction opposite the third rotational direction;
a first rail, a main axis of the first rail aligned with the first axis, the first car comprising a first plurality of wheels attached to a bottom surface of the first car, the first plurality of wheels configured to be engaged with the first rail, the first car configured to move on the first rail, the first rail configured to limit movements of the first car to a linear movement along the first axis, the first winch attached to an external side of the first wagon;
a second rail, a main axis of the second rail aligned with the first axis, the second car comprising a second plurality of wheels attached to a bottom surface of the second car, the second plurality of wheels configured to be engaged with the second rail, the second car configured to move on the second rail, the second rail configured to limit movements of the second car to a linear movement along the first axis, the second winch attached to an external side of the second wagon;
a first winch motor, the first winch motor connected to the first winch, the first winch motor configured to urge the first winch to rotate around the main axis of the first winch;
a second winch motor, the second winch motor connected to the second winch, the second winch motor configured to urge the second winch to rotate around the main axis of the second winch;
a third car configured to move back and forth along a second axis, the second axis perpendicular to the first axis, the third car comprising:
a third wagon; and
a third motor, the third motor disposed inside the third wagon, the third motor configured to urge the third car to move along the second axis;
a third winch associated with the third car;
a third cable interconnected between the third car and the balloon, a first end of the third cable attached to the balloon, a second end of the third cable wrapped around the third winch, the second end of the third cable attached to a third side of the balloon, the third winch configured to:
increase a third length of the third cable between the third car and the balloon responsive to rotating the third winch in a fifth rotational direction around a main axis of the third winch; and
decrease the third length of the third cable between the third car and the balloon responsive to rotating the third winch in a sixth rotational direction around the main axis of the third winch, the sixth rotational direction opposite the fifth rotational direction;
a fourth car configured to move back and forth along the second axis, the fourth car comprising:

a fourth wagon; and
a fourth motor, the fourth motor disposed inside the fourth wagon, the fourth motor configured to urge the fourth car to move along the second axis;
a fourth winch associated with the fourth car;
a fourth cable interconnected between the fourth car and the balloon, a first end of the fourth cable attached to the balloon, a second end of the fourth cable wrapped around the fourth winch, the second end of the fourth cable attached to a fourth side of the balloon, the fourth side of the balloon opposite the third side of the balloon, the fourth winch configured to:
increase a fourth length of the fourth cable between the fourth car and the balloon responsive to rotating the fourth winch in a seventh rotational direction around a main axis of the fourth winch; and
decrease the fourth length of the fourth cable between the fourth car and the balloon responsive to rotating the fourth winch in an eighth rotational direction around the main axis of the fourth winch, the eighth rotational direction opposite the seventh rotational direction;
a third rail, a main axis of the third rail aligned with the second axis, the third car comprising a third plurality of wheels attached to a bottom surface of the third car, the third plurality of wheels configured to be engaged with the third rail, the third car configured to move on the third rail, the third rail configured to limit movements of the third car to a linear movement along the second axis, the third winch attached to an external side of the third wagon;
a fourth rail, a main axis of the fourth rail aligned with the second axis, the fourth car comprising a fourth plurality of wheels attached to a bottom surface of the fourth car, the fourth plurality of wheels configured to be engaged with the second rail, the fourth car configured to move on the fourth rail, the fourth rail configured to limit movements of the fourth car to a linear movement along the second axis, the fourth winch attached to an external side of the fourth wagon;
a third winch motor, the third winch motor connected to the third winch, the third winch motor configured to urge the third winch to rotate around the main axis of the third winch;
a fourth winch motor, the fourth winch motor connected to the fourth winch, the fourth winch motor configured to urge the fourth winch to rotate around the main axis of the fourth winch;

a memory having process-readable instructions stored therein; and
one or more processors configured to access the memory and execute the processor-readable instructions, which, when executed by one or more processors configures the one or more processors to perform a method, the method comprising:
ascending the balloon by:
moving the first car along the first axis and in a first direction;
rotating the first winch in the first rotational direction around the main axis of the first winch;
moving the second car along the first axis and in a second direction, the second direction opposite the first direction;
rotating the second winch in the third rotational direction around the main axis of the second winch;
moving the third car along the second axis and in a third direction;
rotating the third winch in the fifth rotational direction around the main axis of the third winch;
moving the fourth car along the second axis and in a fourth direction, the fourth direction opposite the third direction; and
rotating the fourth winch in the seventh rotational direction around the main axis of the fourth winch; and
descending the balloon by:
moving the first car along the first axis and in the second direction;
rotating the first winch in the second rotational direction around the main axis of the first winch;
moving the second car along the first axis and in the first direction;
rotating the second winch in the fourth rotational direction around the main axis of the second winch;
moving the third car along the second axis and in the fourth direction;
rotating the third winch in the sixth rotational direction around the main axis of the third winch;
moving the fourth car along the second axis and in the third direction; and
rotating the fourth winch in the eighth rotational direction around the main axis of the fourth winch.

* * * * *